(12) United States Patent
Gilson

(10) Patent No.: US 10,804,958 B2
(45) Date of Patent: Oct. 13, 2020

(54) MULTI-BITRATE VIDEO WITH DYNAMIC BLOCKS

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/630,107

(22) Filed: Feb. 24, 2015

(65) Prior Publication Data

US 2016/0248474 A1 Aug. 25, 2016

(51) Int. Cl.
*H04N 21/24* (2011.01)
*H04N 19/10* (2014.01)
(Continued)

(52) U.S. Cl.
CPC ............... *H04B 3/06* (2013.01); *H04N 19/12* (2014.11); *H04N 19/164* (2014.11);
(Continued)

(58) Field of Classification Search
CPC ............ H04N 21/232; H04N 21/2387; H04N 21/23103; H04N 21/23406; H04N 21/2343; H04N 21/238; H04N 21/23805; H04N 21/2385; H04N 21/24; H04N 21/2401; H04N 21/2402; H04N 19/152; H04N 19/174; H04N 19/177; H04N 21/44004; H04N 21/23439; H04N 21/44029;
(Continued)

(56) References Cited

U.S. PATENT DOCUMENTS

2005/0083861 A1* 4/2005 Van Den Heuvel ........................ H04N 21/4344 370/294
2005/0251838 A1* 11/2005 Chandhok ......... H04L 29/06027 725/95

(Continued)

OTHER PUBLICATIONS

EP Search Report Publication (dated Nov. 23, 2016)—App. No. 16157163.3.

(Continued)

*Primary Examiner* — Mulugeta Mengesha
*Assistant Examiner* — Alazar Tilahun
(74) *Attorney, Agent, or Firm* — Banner & Witcoff, Ltd.

(57) ABSTRACT

Methods, systems, computer-readable media, and apparatuses for providing dynamic block control of multi-bitrate video are described. In some embodiments, a computing device may determine transcoder conditions of a transcoder independent of a client device. The computing device may dynamically adjust a block size of one or more blocks of a stream based on the transcoder conditions. In some embodiments, a computing device may receive a stream. The client device may package the stream into a first packaged stream having a first block size and a second packaged stream having a second block size less than the first block size. In some embodiments, a client device may determine an actual minimum number of blocks to buffer prior to initiating content playback based on a received predicted network and/or transcoder quality of service forecast. The client device may adjust its preset minimum number of blocks to the actual minimum number of blocks.

33 Claims, 9 Drawing Sheets

(51) Int. Cl.
*H04N 19/40* (2014.01)
*H04N 19/48* (2014.01)
*H04B 3/06* (2006.01)
*H04N 19/12* (2014.01)
*H04N 19/177* (2014.01)
*H04N 21/236* (2011.01)
*H04N 19/164* (2014.01)

(52) U.S. Cl.
CPC ..... *H04N 19/177* (2014.11); *H04N 21/23611* (2013.01); *H04N 21/2401* (2013.01); *H04N 21/2402* (2013.01)

(58) Field of Classification Search
CPC ........... H04N 21/44209; H04N 19/164; H04N 21/23611; H04N 19/12; H04N 5/783; H04N 21/4622; H04N 21/4722; H04N 21/4825; H04B 3/06
See application file for complete search history.

(56) References Cited

U.S. PATENT DOCUMENTS

| | | |
|---|---|---|
| 2006/0146780 A1 | 7/2006 | Paves |
| 2007/0121678 A1* | 5/2007 | Brooks ............... H04L 12/2801 370/505 |
| 2007/0153916 A1* | 7/2007 | Demircin ........... H04N 21/2365 375/240.26 |
| 2009/0003432 A1* | 1/2009 | Liu .................. H04N 21/23406 375/240.01 |
| 2009/0028142 A1* | 1/2009 | Schmidt ................ H04N 7/173 370/389 |
| 2009/0083279 A1 | 3/2009 | Hasek |
| 2010/0142915 A1* | 6/2010 | McDermott ......... G11B 27/034 386/343 |
| 2012/0117225 A1* | 5/2012 | Kordasiewicz ..... H04L 65/1083 709/224 |
| 2012/0278449 A1* | 11/2012 | Wu .................. H04N 21/23424 709/219 |
| 2014/0143439 A1* | 5/2014 | Ramamurthy ... H04N 21/23439 709/231 |

OTHER PUBLICATIONS

Mar. 22, 2018—European Office Action—EP 16157163.3.
Sep. 12, 2019—European Summons to Oral Proceedings—EP 16157163.3.

* cited by examiner

MULTI-BITRATE VIDEO WITH DYNAMIC BLOCKS

BACKGROUND

Multi-bitrate systems may include a transcoder that transcodes an input stream into multiple streams (e.g., 6 streams) each having a different bitrate. A media device (e.g., a cell phone, tablet, computer, in-vehicle entertainment system, or any other IP-enabled device) may, based on its available bandwidth, select the bitrate stream from which it wants to playback the content. For example, when the client device is connected via a local Wi-Fi network of e.g., a home or business, as the client device moves away from an access point of the local Wi-Fi network, the client device may experience a drop in modulation and/or bandwidth throughput (e.g., the client device may recognize that the client device is taking longer and longer to download sequential blocks of the stream into its buffer). In order to keep up with the live stream and avoid entering a buffering state, the client device may switch to a lower bitrate stream. If the client device enters a buffering state after playback of the content has begun, then playback of the content, and consequently the user, is interrupted. Conversely, as the client device moves closer to the access point, the client device may experience an increase in modulation and/or bandwidth throughput. In response, the client device may switch to a higher bitrate stream to take advantage of, for example, the higher resolution and/or quality of higher bitrate streams.

Before playback of the content begins, conventional media devices must download, via the stream, a static (i.e., fixed) preset minimum number of blocks. In other words, the media device will not begin playing the content until it has buffered the present minimum number of blocks as set forth by e.g., its codec. As a result, there is a delay (e.g., a latency time) until playback begins. The latency time may be from the time the client device begins receiving the blocks of the live stream until the client device has buffered the preset minimum number of blocks. Quite often, the actual minimum number of blocks the client device should buffer prior to initiating playback of content such that the content will at least initially play without interruption is less than the preset minimum number of blocks resulting in an unnecessarily long latency time during session setup. Further, a block size of each of the blocks of the stream in conventional multi-bitrate systems may be static (i.e., fixed). Additionally, each block may have the same block size. As a result, even if the block size is not the optimum block size of the blocks, conventional systems are stuck with using a preset static block size resulting in efficiencies. For example, the media device may have to download larger than optimal blocks thereby increasing the latency time in beginning playback of the streamed media.

Currently, the media devices do not know the conditions of the network (e.g., a hybrid fibre-coaxial (HFC) network) and, thus, always select the lowest bitrate stream. For example, the media devices are simply selecting the lowest bitrate stream, evaluating their speed on the current bitrate, and deciding whether to switch to other bitrates streams based on the evaluation. As a result of initially selecting a low bitrate stream, the first few blocks of the stream may have a poor quality level resulting in the media devices beginning playback of the content at a very low quality level (e.g., a low resolution). Additionally, in some instances, the media devices may initially select a stream and/or eventually switch to a stream that might not be the most optimal stream based on conditions of the network and/or transcoder.

SUMMARY

Accordingly, there is a need to reduce the latency time to begin playback of streamed media and to enable more efficient determination and use of network conditions.

Aspects of the disclosure relate to computer hardware and software. In particular, one or more aspects of the disclosure generally relate to computer hardware and software for providing dynamic block control of multi-bitrate video.

Various aspects of the disclosure provide more efficient, effective, functional, and convenient ways of providing multi-bitrate video with dynamic blocks. In particular, in one or more embodiments discussed in greater detail below, dynamic block distribution management functionalities are implemented, and/or used in a number of different ways to provide one or more of these and/or other advantages.

In some embodiments, a computing device may determine one or more transcoder conditions of a transcoder independent of a client device. The computing device may dynamically adjust a block size of one or more blocks of a stream based on the one or more transcoder conditions. The computing device may transmit the stream to the client device.

In some embodiments, a computing device may receive a stream from a transcoder. The computing device may package the stream into a first packaged stream having a first block size and a second packaged stream having a second block size less than the first block size.

In some embodiments, a client device may receive a predicted network and transcoder quality of service (QoS) forecast. The client device may determine an actual minimum number of blocks to buffer prior to initiating content playback such that the playback is uninterrupted for a predetermined period of time based on the received predicted network and transcoder QoS forecast. The client device may adjust its preset minimum number of blocks the client device is to buffer prior to initiating content playback to the actual minimum number of blocks.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
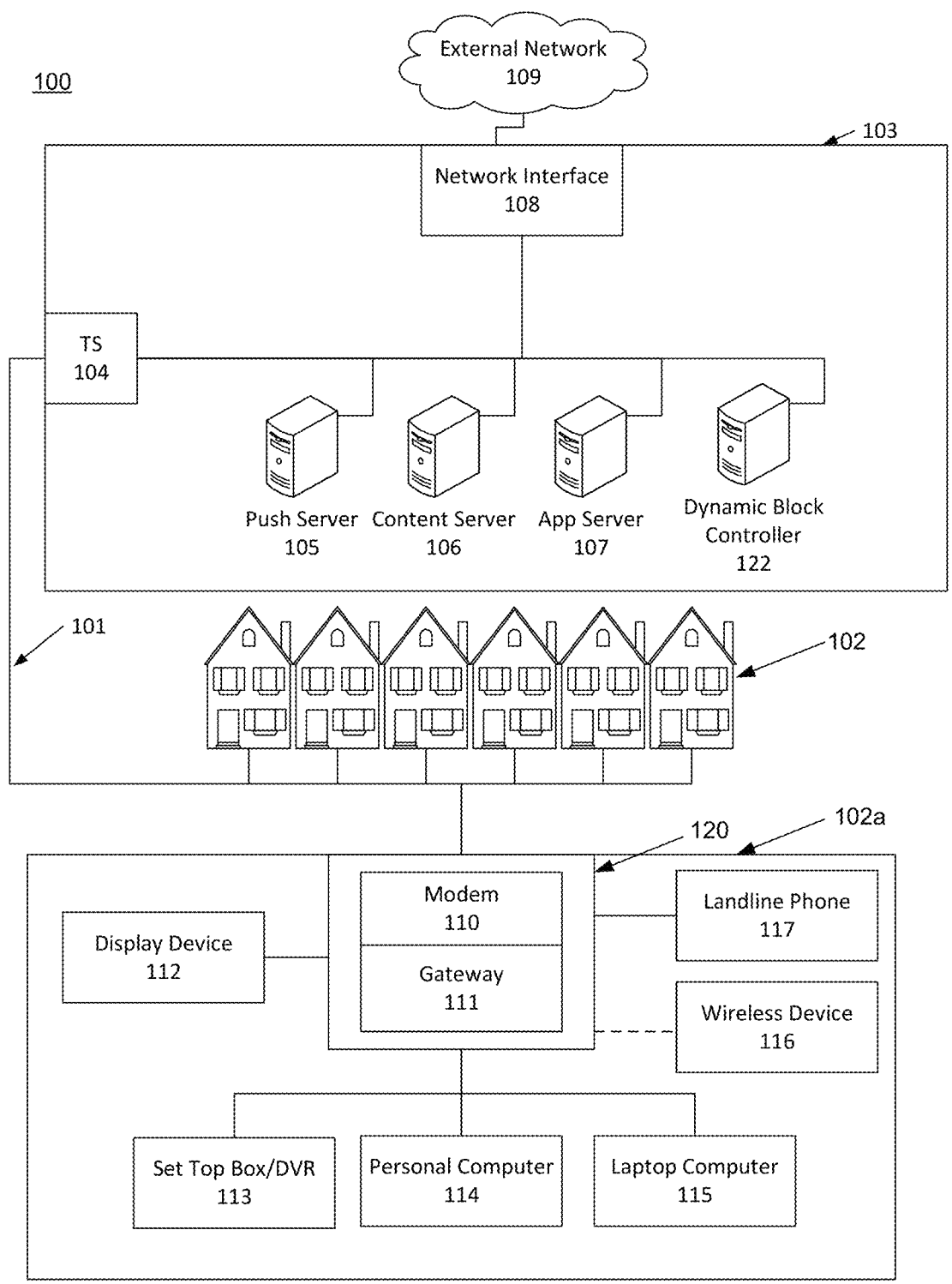
FIG. 1 illustrates an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 or headend. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway 111 (e.g., an interface device). The modem 110 may be connected to, or be a part of, the gateway 111. The gateway 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Typically, when a client device such as, for example, the wireless device 116 at the premise 102a sends to the local office 103 a request to receive a stream of content (e.g., a movie), the local office 103 may, after appropriate account verification, provide and/or otherwise make available multiple streams of the movie at different bitrates from which the client devices decide which stream and which blocks to fetch. A bitrate is a measure of the number of bits per some unit of time (e.g., seconds) that can be transmitted over the network. However, before the client device initiates and/or otherwise begins playback of the content, the client device may wait until a static preset number of blocks contained in a selected stream are buffered at the client device. Typically, the client device may include a policy and/or rule setting the preset minimum number of blocks. The difference in time between the time at which the client begins receiving the first block of the selected stream and the time at which the client device begins playback of the content contained in the stream (i.e., the time at which the client device fully receives the last block of the preset minimum number of blocks) may be referred to as a latency time (e.g., a delay). In some embodiments, the preset minimum number of blocks may be associated with a preset block size.

The local office 103 may include a dynamic block controller 122. Although shown separately, the dynamic block controller 122 may be combined with one or more of the push server 105, the content server 106, and the application server 107. In order to reduce the latency time for a client device (e.g., a wireless device 116 such as a tablet at premise 102a) to initiate and/or otherwise begin playback of content streamed to the client device, the dynamic block controller 122 may, based on predicted network and transcoding conditions or "predicted network and transcoder quality of service (QoS) forecast," interleave blank blocks (e.g., null blocks) into the stream and/or adjust (e.g., reduce) the block size of the blocks of the stream to enable the client device to more quickly fill its preset buffer requirements (e.g., the preset minimum number of blocks). As a result, the client device may be able to more quickly initiate content playback resulting in a reduced latency time.

While the above may be done for one or more main streams servicing multiple client devices. In one or more other arrangements, for client devices initially requesting a stream of particular content, the dynamic block controller 122 may, in response, provide a special "onboarding" stream (separate from the main streams) where the dynamic block controller 122 provides either interleaved blanks blocks and/or real blocks that are smaller in size and then may gradually reduce the rate (e.g., a rate below a threshold rate) at which blank blocks are interleaved and/or gradually increase the block size of the real blocks to a normal block size (e.g., a rate below a threshold rate). At that point, these client devices may switch from the onboarding stream to one of the main streams (e.g., streams other than onboarding streams) already servicing other client devices.

The dynamic block controller 122 may determine the predicted network and transcoding QoS forecast based on the current network and transcoding conditions and predicted near-future (e.g., within a predetermined time period) network and transcoding conditions. The network conditions may account for network conditions of the premise 102a, network condition of the "last mile" of the network, and/or network conditions of the "backbone" of the network. The network conditions may include available bandwidth, throughput, downstream speed, upstream speed, server load, round trip time, capacity, delay and/or other quality of service metrics. The transcoding conditions may include, for example, available transcoding resources, the transcoding-on-demand architecture, or the like. For example, the transcoding-on-demand architecture might not require all of the streams at the different bitrates to be available at a given moment in time. For example, a transcoder may make available three of six streams. In such instances, the transcoder may remove one of six streams to add another one of the six streams. The transcoding-on-demand architecture may affect how many blocks and/or content data the client device should buffer in order to initiate uninterrupted playback of the content. Using the predicted network and transcoding QoS forecast, the dynamic block controller 122 may determine an actual minimum amount of blocks and/or data to enable the client device to begin uninterrupted playback of the content irrespective of (e.g., without regard for) the number of blocks preset by the client device. For example, if the network is currently congested and/or predicted to be congested in the near future, the actual minimum number of blocks may be greater than the actual minimum number of blocks when the network is not currently congested and/or predicted to be not congested in the near future.

Quite often, the actual minimum amount of blocks and/or amount of content data to enable the client device to begin uninterrupted playback of the content for a predetermined period of time is less than the preset minimum number of blocks (e.g., associated with a preset amount of content data). In other words, the latency time to begin initial playback of the content is unnecessarily long and may, advantageously, be reduced without affecting the quality of the playback of the content.

In order to reduce the latency time, the dynamic block controller 122 may trick the decoder of the client device. For example, as noted above, the decoder of the client device may have a preset minimum number of blocks that it receives prior to initiating playback of the content. However, because the decoder simply checks to see if the buffer has the preset minimum number of blocks and does not inspect the content (e.g., the file size) of the blocks themselves, the dynamic block controller 122 may interleave (e.g., insert) blank blocks into the stream (thereby reducing the number of real blocks) and/or reduce the size of the real blocks of the stream to reduce the latency time. The latency time may be reduced because fewer or smaller real blocks may be downloaded faster than a preset minimum number of real blocks having a preset block size.

As noted above, the dynamic block controller 122 may reduce the time it takes to fill the buffer of the client device with the preset minimum number of blocks by interleaving blank blocks with real blocks. For example, the dynamic block controller 122 may insert blank blocks using an algorithm that accounts for the actual minimum amount of blocks and/or actual minimum amount of content data to initiate uninterrupted playback of the content. For example, an initial portion of the stream may include real blocks and blank blocks. A blank block may be any block having a payload (e.g., block size, file size, etc.) of zero or near zero and/or a payload below a predetermined payload size. The blank blocks may include appropriate headers (e.g., mpeg headers) and/or other information to enable the decoder of the client device to process the blank blocks and use/view the blank blocks as though they are real blocks. The blank blocks are effectively "skipped" during content playback by the client device because they might not contain content data. The client device may "skip" the blank block during playback without interrupting the content playback (e.g., without the user noticing) by immediately playing the next real block. A real block may be any block of content having a non-zero payload (e.g., block size, file size, etc.), and/or a payload above a predetermined payload size. This method allows the clients to remain running their current decode method without implementing a new protocol that would require client updates. During content playback, the client device may play the content contained in the real blocks.

An initial portion of the stream may have a total number of blocks equivalent to the preset minimum number of blocks. The total real number of blocks of the initial portion may be equivalent to the actual minimum number of blocks and/or the actual minimum amount of content data to begin uninterrupted playback based on the predicted network and transcoder QoS forecast. In some embodiments, the minimum amount of content data may be evenly distributed across the real blocks of the initial portion of the stream (e.g., the real blocks of the initial portion may be equal in block size to one another). In some embodiments, one or more of the real blocks of the initial portion may have a different block size from one or more other real blocks of the initial portion.

The blank blocks may be inserted at any selected interval (e.g., inserted every X real blocks). For instance, blank blocks may be inserted in between each real block of the stream (e.g., alternating between real blocks and blank blocks). In an example where the preset minimum number of blocks is 10, each real block would be followed by a blank block resulting in 5 real blocks and 5 blank blocks being streamed. Because the blank blocks have e.g., a zero payload and/or a payload below a predetermined payload size (e.g., a block size near zero), the client device may download the blank blocks faster than real blocks thereby reducing the latency time. For example, blank blocks may be inserted every third block (i.e., every two real blocks may be followed by a blank block) or inserted at any other interval.

The dynamic block controller 122 may then gradually reduce the number of blank blocks (e.g., inserting the blank blocks at longer intervals than the interval initially selected) until eventually only real blocks are streamed to the client device to enable the dynamic block controller 122 to avoid incorrect compensation in the estimated bitrate by the client device as will be discussed in greater detail below. Each subsequent portion of the stream may have a number of blocks equivalent to the preset number of blocks. Additionally or alternatively, the dynamic block controller 122, during the initial portion of the stream and/or during a subsequent portion of the stream, may adjust the interleaving of blank blocks based on updates to the predicted network and transcoding QoS forecast.

Additionally or alternatively, in some embodiments, the dynamic block controller 122 may reduce the latency time by adjusting (e.g., reducing) the size of the real blocks based on the actual minimum amount of data. A real block may include one or more groups of pictures (GOPs). Each GOP may include an intra-coded picture (I-frame), one or more predicted pictures (P-frames), and one or more bi-predictive pictures (B-frames). Each GOP may start with an I-frame, which may be a full picture (e.g., a static image). A P-frame (also known as delta frames) may include changes in the image from the previous frame (e.g., the P-frame might not include a full picture). A B-frame may include changes in the image from the previous frame and changes in the images from the following frame (e.g., the B-frame might not include a full picture). In some embodiments, the frames may be represented at a slice level of representation. In such embodiments, the I-frames, P-frames, and B-frames may be respectively replaced by I-slices, P-slices, and B-slices. In some instances, the dynamic block controller 122 may adjust the size of a real block by adjusting (e.g., reducing) the number of GOPs in the real block. For example, a block preset to have 3 GOPs may be reduced to 2 GOPs.

Additionally or alternatively, in some instances, the dynamic block controller 122 may adjust the size of one or more of the GOPs in one or more blocks (e.g., by adjusting the I-frame interval) of an initial portion of the stream based on e.g., an algorithm that accounts for the actual minimum amount of data to begin uninterrupted playback of the content for a predetermined period of time by the client device. The I-frame interval may be a time period between two sequential I-frames. For example, a preset interval of an I-frame (e.g., a time period between I-frames) may be reduced from e.g., three seconds to half a second. The initial portion of the stream may have a number of real blocks equivalent to the preset minimum number of real blocks. However, the actual minimum amount of content data may be distributed (e.g., evenly or unevenly) across the real blocks of the initial portion of the stream. Because the of smaller block size, the buffer of the client device may be filled more quickly (e.g., the client device may download the preset number of blocks more quickly). Subsequent portions of the stream may have a gradual increase in the block size until eventually the block size of the blocks may equal a preset block size in order for the dynamic block controller 122 to avoid incorrect bitrate compensation by the client device. Each subsequent portion of the stream may have a number of blocks equivalent to the preset minimum number of blocks.

The dynamic block controller 122 may, during the initial and/or subsequent portions of the stream, update/adjust the I-frame interval based on an updated predicted network and transcoding QoS forecast and/or feedback received from the client device. The feedback may include, for example, how often the client device is switching between streams at different bitrates, how many blocks/time is buffered by the client device, the bitrate of the stream currently used by the client device, the network conditions experienced by the client device, GPS location and/or heading of the client device, and/or the like. The dynamic block controller 122 may then, using an algorithm, gradually increase the size of the real blocks and/or I-frame interval until the real blocks are at least the preset size of real blocks. Additionally, the dynamic block controller 122 may align one or more blocks and/or I-frames on each of the streams at transition points so that the client device may switch from stream to stream without interruption in playback of the content.

The dynamic block controller 122 may have access to a topology of a network and may be able to identify geographic areas of the network that should have a strong signal or signals with a fast communication speed and geographic areas of the network that should have a weak signal or signals with a slow communication speed. In one example, the dynamic block controller 122 may receive from a client device feedback including a GPS location and heading the client device. The dynamic block controller 122 may determine based on the feedback that the client device is on a train (or other moving vehicle) and that the client device is about to enter a geographic area having 2G connectivity rather than long-term evolution (LTE) connectivity. Because the dynamic block controller 122 may predict change in connection speed ahead of time, the dynamic block controller 122 may account for this ahead of time (e.g., before the client buffer starts draining). While the above example was discussed in terms of cellular connectivity speeds, the example may also apply to Wi-Fi wireless link rates, which may also be referred to as physical layer (PHY) rates. Additionally, while the above example was discussed in terms of a moving vehicle, the example may also apply to a user walking or running with the client device.

Additionally or alternatively, in some embodiments, in order to reduce the latency time, the dynamic block controller 122 might not trick the decoder of the client device. Instead, the dynamic block controller 122 may send the predicted network and transcoding QoS forecast and/or some other quality of service measurement to the decoder of the client device. The client device may adjust its preset minimum number of blocks based on the received predicted network and transcoding QoS forecast and/or other quality of service measurements. In some embodiments, the dynamic block controller 122 may send a command or instruction forcing the client device to adjust its present minimum number of blocks based on the predicted network and transcoding QoS forecast and/or other quality of service measurements.

Figure 2:
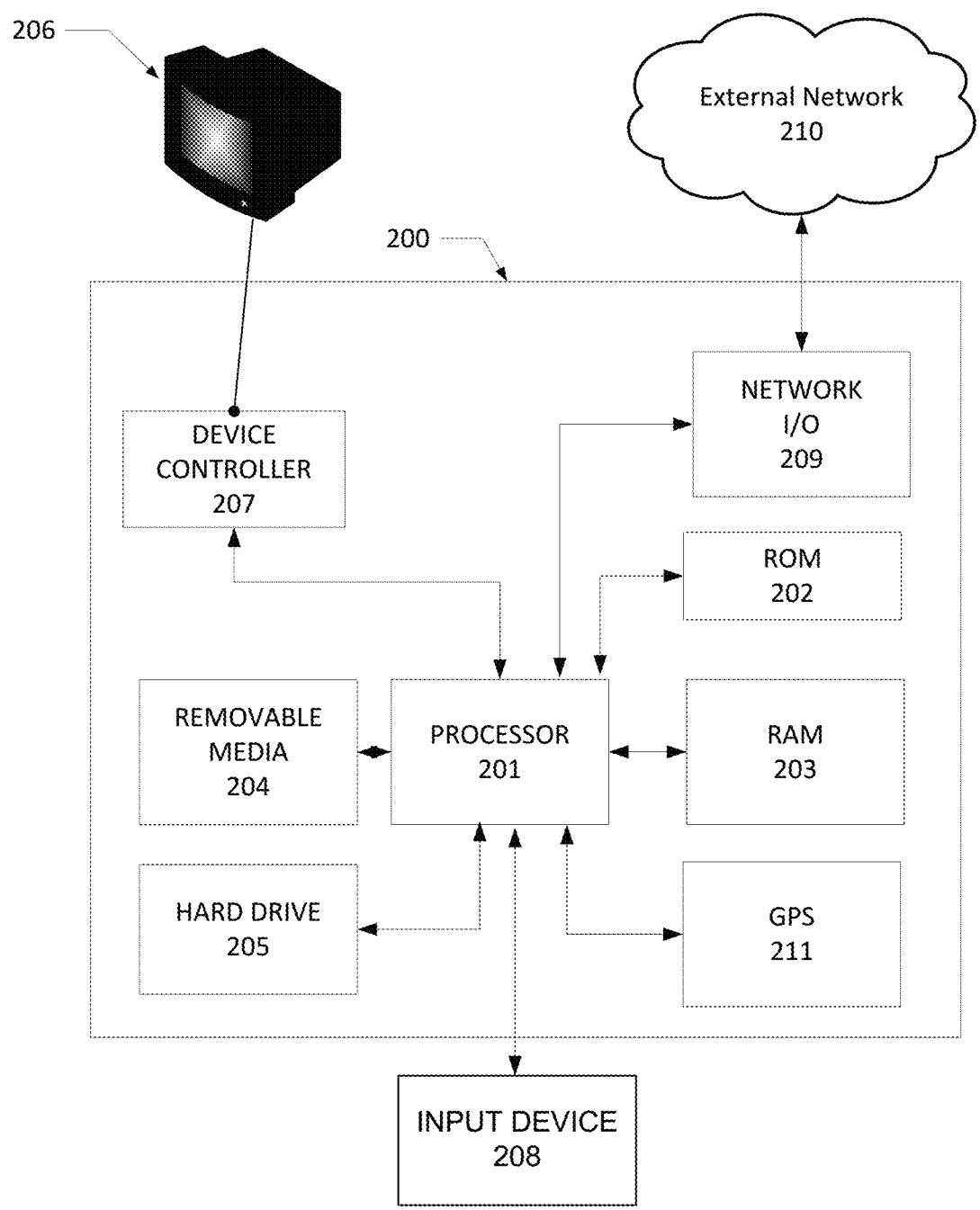
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 4:
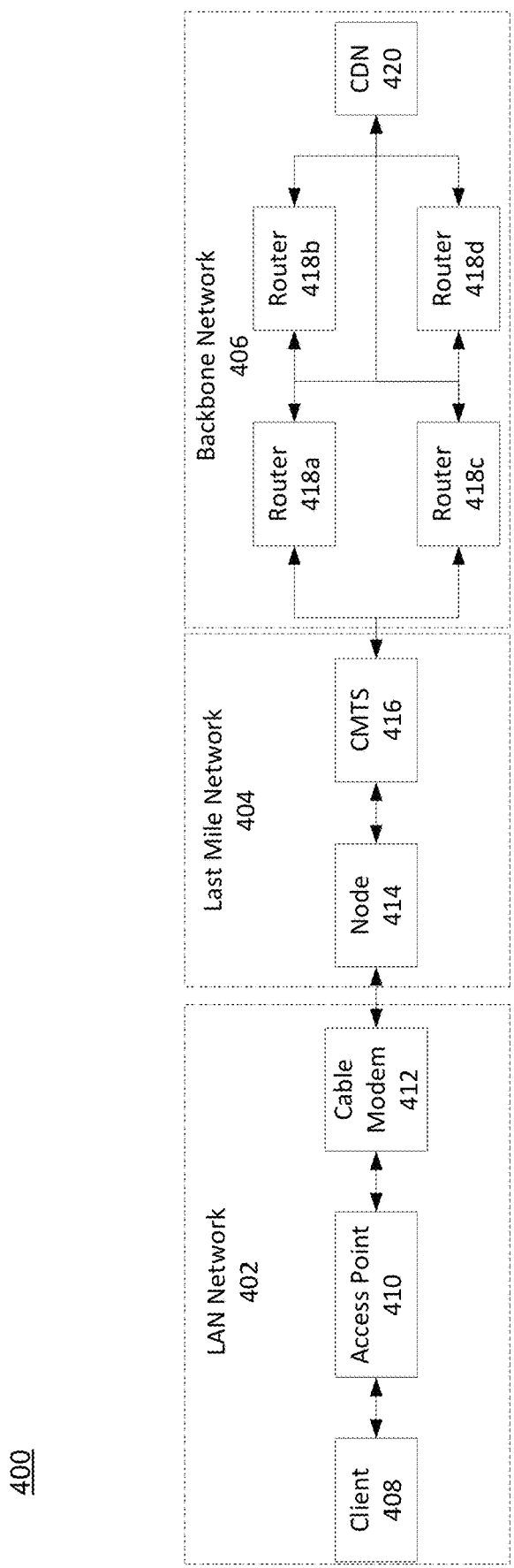
FIG. 4 illustrates an example network accounted for in determining a predicted network and transcoder QoS forecast in accordance with one or more illustrative aspects discussed herein.

FIG. 4 illustrates an example network accounted for in determining a predicted network and transcoder QoS forecast in accordance with one or more illustrative aspects discussed herein. A network 400 may include a local area network (LAN) 402 (e.g., a home network of a premise 102a), a last mile network 404, and a backbone network 406. The LAN network 402 may include a cable modem 412, an access point 410, and one or more client device 408 (e.g., computer, tablet, mobile phone, STB, DVR, etc.). The last mile network 404 may include one or more nodes 414 and a CMTS 416. The backbone network 406 may include multiple backbone routers 418a-d and a content delivery network (CDN) 420.

Figure 5:
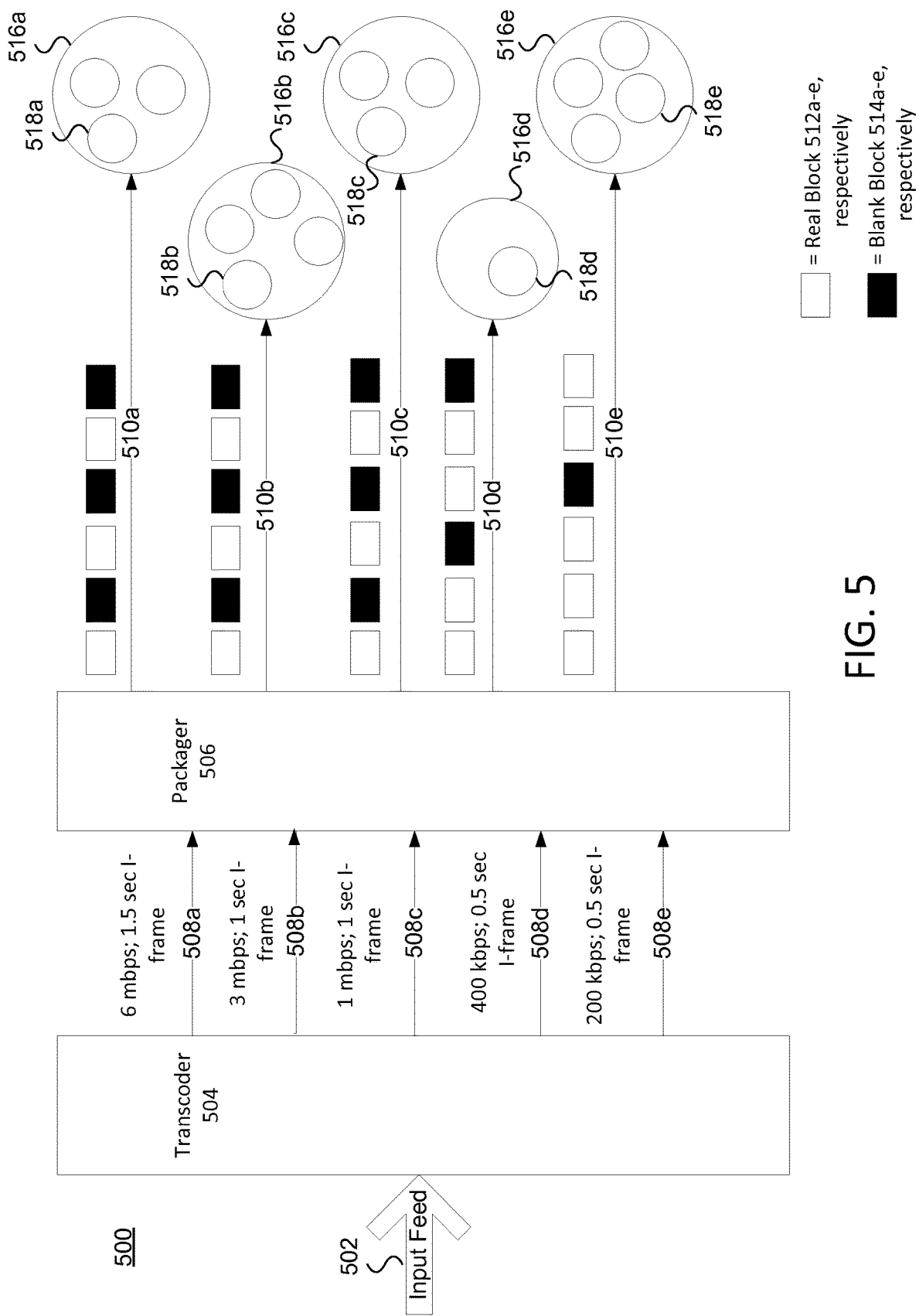
FIG. 5 illustrates an example transcoder system for dynamically interleaving blank blocks into one or more streams in accordance with one or more illustrative aspects discussed herein.

FIG. 5 illustrates an example transcoder system for dynamically interleaving blank blocks into one or more streams in accordance with one or more illustrative aspects discussed herein. The transcoder system 500 may be located in any device of the local office 103. The transcoder systems 500 may include a transcoder 504 and a packager 506, which may be embodied in a single device or on two separate devices described herein. The transcoder 504 may receive an input feed 502 (e.g., a master feed, encoded video, etc.). The transcoder 504 may transcode the input feed 502 into multiple streams/feeds 508a-e with each stream having a different bitrate. For example, the stream 508a may have a bitrate of 6 megabytes per second (mbps) and may have an I-frame interval of 1.5 seconds. The stream 508b may have a bitrate of 3 mbps and an I-frame interval of 1 second. The stream 508c may have a bitrate of 1 mbps and an I-frame interval of 1 second. The stream 508d may have a bitrate of 400 kilobytes per second (kbps) and an I-frame interval of 0.5 seconds. The stream 508e may have a bitrate of 200 kbps and an I-frame interval of 0.5 seconds. The packager 506 may receive the streams 508a-e from the transcoder and may package each of those streams into packaged streams 510a-e for delivery to client devices 518a-e (e.g., the client device 408) of client groups 516a-e. In this system, the packager 506 may interleave one or more blank blocks 514a-e with one or more real blocks 512a-e of the streams 510a-e to reduce the buffer time as will be discussed in further detail below.

Figure 6:
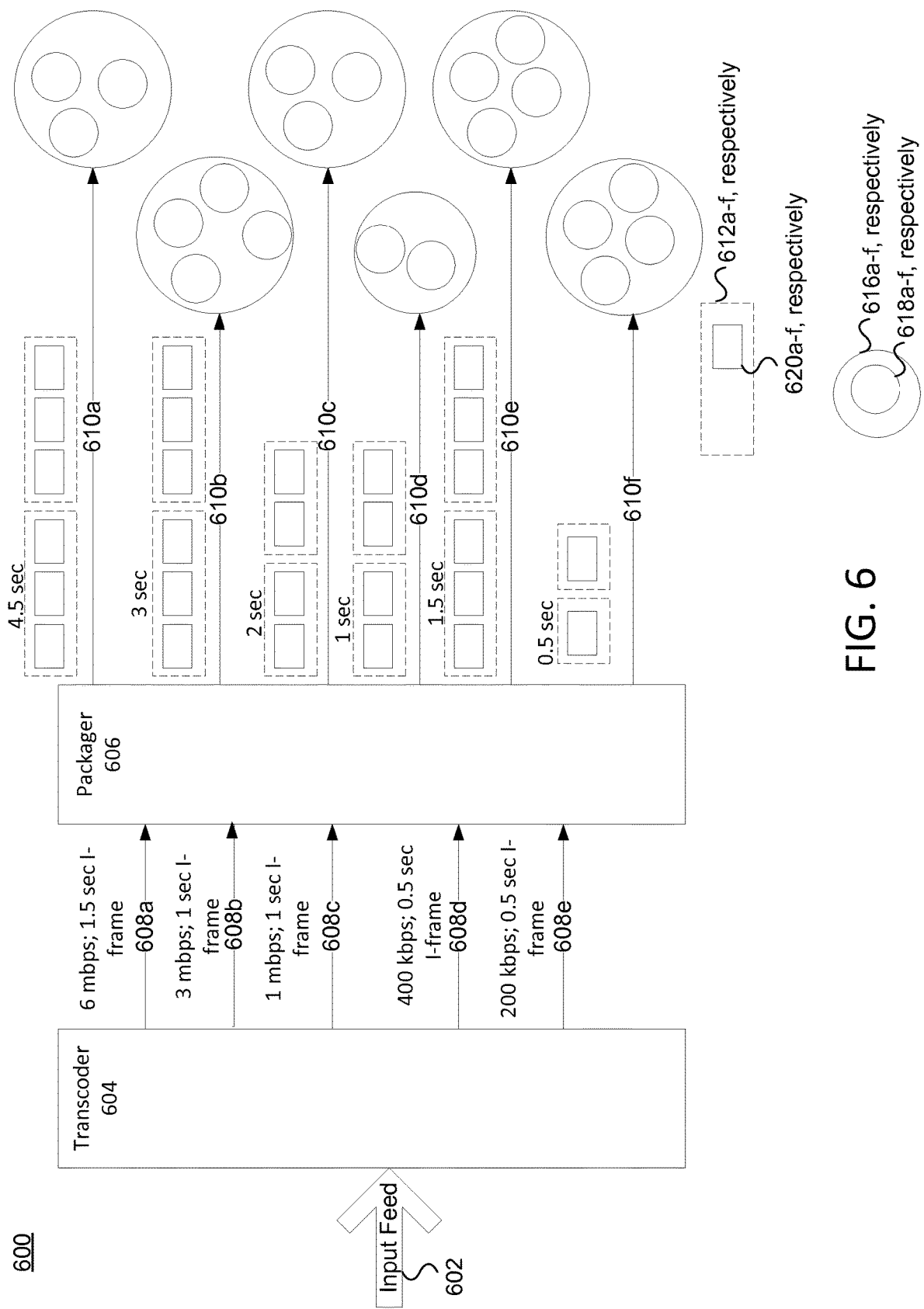
FIG. 6 illustrates an example transcoder system for dynamically adjusting block size of blocks in one or more streams in accordance with one or more illustrative aspects discussed herein.

FIG. 6 illustrates an example transcoder system for dynamically adjusting block size of blocks in one or more streams in accordance with one or more illustrative aspects discussed herein. The transcoder system 600 may be located in any device of the local office 103. The transcoder systems 600 may include a transcoder 604 and a packager 606, which may be embodied in a single device or on two separate devices described herein. The transcoder 604 may receive an input feed 602 (e.g., a master feed, encoded video, etc.). The transcoder 604 may transcode the input feed 602 into multiple streams/feeds 608a-e with each stream having a different bitrate. For example, the stream 608a may have a bitrate of 6 megabytes per second (mbps) and may have an I-frame interval of 1.5 seconds. The stream 608b may have a bitrate of 3 mbps and an I-frame interval of 1 second. The stream 608c may have a bitrate of 1 mbps and an I-frame interval of 1 second. The stream 608d may have a bitrate of 400 kilobytes per second (kbps) and an I-frame interval of 0.5 seconds. The stream 608e may have a bitrate of 200 kbps and an I-frame interval of 0.5 seconds. The packager 606 may receive the streams 608a-e from the transcoder and may package each of those streams into packaged streams 610a-e for delivery to client devices 618a-e (e.g., the client device 408) of client groups 616a-e. In this system, the packager 606 may generate an onboarding stream 610f and, additionally or alternatively, adjust a block size of one or more real blocks 612a-f, each of which will be discussed in further detail below. In some embodiments, the transcoder system 500 and the transcoder system 600 may be two different transcoding systems. In other embodiments, the transcoder system 500 and the transcoder system 600 may be the same transcoding system having the capabilities of both systems.

Figure 3:
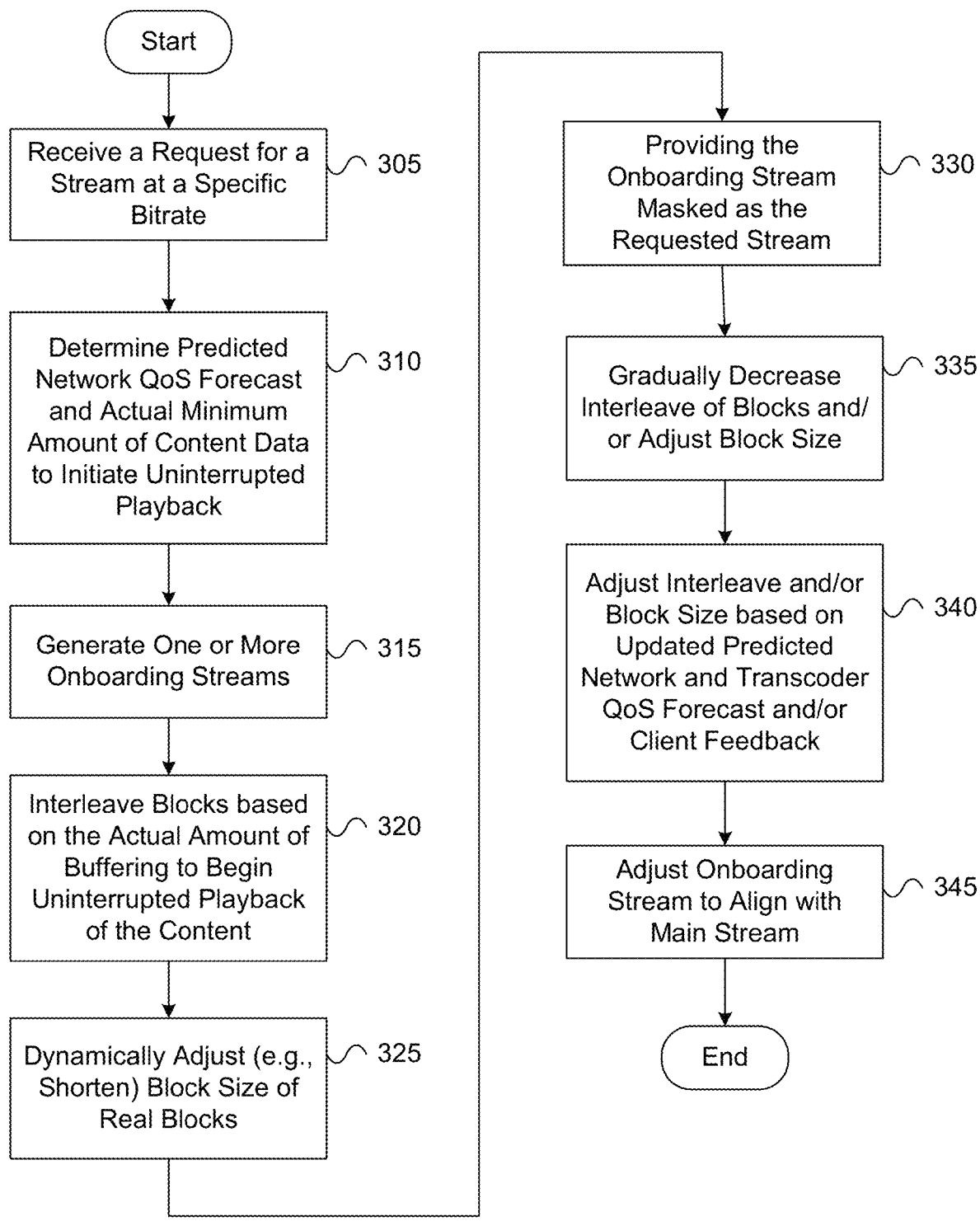
FIG. 3 illustrates a flowchart of an example of a method of dynamic block control in accordance with one or more illustrative aspects discussed herein.

FIG. 3 illustrates a flowchart of an example of a method of dynamic block control in accordance with one or more illustrative aspects discussed herein. In one or more embodiments, the method of FIG. 3 and/or one or more steps thereof may be performed by a computing device (e.g., computing device 200). In other embodiments, the method illustrated in FIG. 3 and/or one or more steps thereof may be embodied in computer-executable instructions that are stored in a computer-readable medium, such as a non-transitory computer-readable memory.

As seen in FIG. 3, the method may begin at step 305 in which a dynamic block controller may receive a request for a stream at a specific bitrate (also referred to herein as the requested stream). For example, in step 305, the dynamic block controller 122 may receive from a client device a request for a 400 kbps stream. The dynamic block controller 122 may receive the request prior to the client device receiving/downloading content data from any other stream.

In step 310, the dynamic block controller 122 may determine a predicted network and transcoding QoS forecast and an actual minimum amount of content for the client device to buffer prior to initiating content playback. For example, in step 310, the dynamic block controller 122 may determine, in response to the received request, the current and predicted near future (e.g., within a predetermined time period) network conditions and transcoder conditions. For example, the dynamic block controller 122 may determine the network conditions of the network 400 shown in FIG. 4. While in the above example the predicted network and transcoder QoS forecast was in response to receiving a request, in one or more other arrangements, the dynamic block controller 122 may continuously or periodically determine the predicted network and transcoder QoS, even if the request of step 305 has not yet been received.

In order to determine each of the network conditions, the dynamic block controller 122 may send a request for network status parameters (e.g., downstream speed, upstream speed, bandwidth, throughput, QoS Reservations, or the like) to one or more of the devices. For example, in order to determine the network conditions of the LAN network 402 (e.g., a home Wi-Fi network), the dynamic block controller 122 may send to one or more of the client devices 408, the access points 410, and/or the cable modem 412 a request for their respective network status parameters and, in response, may receive network status parameters of the responding devices. Additionally or alternatively, in some embodiments, the dynamic block controller 122 may send the request to one or more other devices on the network (e.g., the local office 103) that may contain the network conditions of the home network 402. Similarly, the dynamic block controller 122 may determine the network conditions of the last mile network 404 (e.g., the HFC network within a predefined distance to the home). For example, the dynamic block controller 122 may send, to the one or more of the nodes 414 and/or the CMTS 416, a request for their respective network status parameters and, in response, may receive the network status parameters of the responding devices. For example, the nodes 414 may indicate how many client devices are transmitting and receiving data from that node 414. Similarly, the dynamic block controller 122 may determine the network conditions of the backbone network 406. For example, the dynamic block controller 122 may send, to one or more of the backbone routers 418 and/or the CDN 420, a request for their corresponding network status parameters and, in response, may receive the network status parameters of the responding devices. Rather than sending a request and receiving a response, in an alternative embodiment, a publish/subscribe model may be used. For example, the dynamic block controller 122 may request updates from various network entities and when there is a change to the network conditions one or more of the network entities may send an alert to the dynamic block controller 122. The alert may include network status parameters of the network entity that sent the alert. Additionally or alternatively, in some embodiments, rather than the dynamic block controller 122 asking the various network devices to report their status, the dynamic block controller 122 may directly measure the status by measuring response time, latency, jitter, etc.

The dynamic block controller 122 may, using the network status parameters from each of the responding devices, determine the current and predicted future network conditions of one or more of the home network 402, the last mile network 404, and/or the backbone network 406 to develop an overall picture of the network conditions of the network 400.

The dynamic block controller 122 may also determine the transcoding conditions of a transcoding system (e.g., the transcoder systems 500, 600 respectively shown in FIGS. 5 and 6). The transcoding conditions may include, for example, available transcoding resources, the transcoding-on-demand architecture, or the like. For example, the transcoding-on-demand architecture may limit the number of streams that can be available to a client device at a given moment in time. The limit on the number of streams may be a predetermined value. For example, a transcoder may make available three of the five streams 508a-e. In such instances, the transcoder may remove one of five streams 508a-e to add (e.g., provide, transmit, etc.) another one of the five streams 508a-e. The transcoding-on-demand architecture may affect how many blocks and/or content data the client device should buffer in order to initiate uninterrupted playback of the content for a predetermined period of time.

Using the predicted network and transcoding QoS forecast, the dynamic block controller 122 may determine the actual minimum amount of buffering before initiating playback based on the predicted network and transcoder QoS forecast irrespective of (without regard for, independent of, etc.) a preset number of blocks set by e.g., a decoder of the client device. For each client device, in step 310, the dynamic block controller 122 may determine the actual minimum amount or number of blocks and/or content data that the client device should buffer prior to initiating playback of content so that playback of the content may continue uninterrupted for at least a predetermined period of time. For example, if the network is currently congested and/or predicted to be congested in the near future, the actual minimum number of blocks may be greater than the actual minimum number of blocks if the network is not currently congested and/or predicted to be not congested in the near future. The actual minimum number of blocks for one client device may be different than the actual minimum number of blocks for another client device, even if the client devices are within the same home or business and connected to the same network if the client devices have different Wi-Fi PHY bandwidth rates.

If the optimum current bitrate stream provided by the transcoder is not currently part of the transcoding-on-demand architecture but a less optimum bitrate stream is available, the dynamic block controller 122 may determine the minimum amount of blocks and/or content data using the less optimum bitrate stream. In some embodiments, the dynamic block controller 122 may instruct the transcoding system (e.g., transcoding system 500, 600) to make the more optimum stream available (e.g., by removing a less optimum stream and adding the more optimum stream to the transcoding system).

In step 315, the dynamic block controller 122 may generate one or more onboarding streams that account for the predicted network and transcoder QoS forecast and/or the minimum amount of content data determined in step 310 as will be discussed below. An onboarding stream may be used, for example, for client devices requesting a new service. By generating the onboarding stream for use with client devices requesting a new service, any manipulation of the onboarding stream may not affect the client devices receiving other streams associated with the service (also referred to herein as main streams). In other words, the main streams providing the service to the other client devices might not be manipulated (e.g., by interleaving blank blocks or adjusting the block size of real blocks). In such cases, multiple (e.g., all) client devices may request the same blocks. But, the packager (e.g., packager 506, 606) may respond to client devices differently based on whether the requesting client device is requesting a new service. For example, the packager 606 may respond to client devices requesting a new service with different blocks (e.g., using the onboarding stream) than to the client devices that have already been requesting the service and/or otherwise have already begun playback of content associated with the service. However, in some embodiments, an onboarding stream might not be generated and, in such embodiments, the dynamic block controller 122 may instruct the transcoding system (e.g., transcoding system 500, 600) to manipulate one or more of the main streams.

The onboarding stream may be generated by the transcoder 604 or by the packager 606. When a transcoder (which sets the GOP lengths) encodes an alternative onboarding stream, the main stream may only have one GOP per block. However, the alternative onboarding stream may have smaller blocks sizes.

As an example, the packager 606 may generate the onboarding stream 610f. For example, the packager 606 may receive, from the transcoder 604, the streams 608a-e including corresponding I-frame intervals at different bitrates. The packager 606 may then package the streams 608a-e into packaged streams 610a-f by grouping one or more GOPs 620a-f, which may begin with I-frames, into multiple real blocks 612a-f. The packager 606 may also generate, for one or more of the received streams 608a-e, a corresponding onboarding stream (e.g., a duplicate stream at the same bitrate and/or I-frame interval). For example, the packager 606 may package the stream 408e into a packaged stream 610e (as discussed above) and an onboarding packaged stream 610f (e.g., a stream configured to lower the latency time to begin playback of content by a client device). Each stream 610a-f may include multiple real blocks 612a-f, each real block 612a-f may include one or more GOPs 620a-f, and each GOP 620a-f may begin with an I-frame followed by one or more P-frames and/or one or more B-frames of the content data. The GOPs may be grouped in a sequential order to enable coherent playback of the content by the client devices 618.

A block size of each real block 612a-f may be a time-based measurement and may be between 0.1 seconds and 5 seconds. The block size may correlate to the number of GOPs 620a-f in the real block 612a-f and/or to the I-frame interval. For example, the block size may be equivalent to the number of GOPs 620a-f in the real block 612a-f multiplied by the I-frame interval. For example, the packaged stream 610a may have a bitrate of 6 mbps, a 1.5 second I-frame interval, and may include multiple real blocks 612a each having three GOPs 620a. Because the I-frame interval is 1.5 seconds and each real block 612a has 3 GOPs 620a, the block size may be 4.5 seconds (e.g., the 1.5 second I-frame interval multiplied by the 3 GOPs 620a). In a similar manner, the packaged stream 610b may have a 3 mbps bitrate and may include 3 GOPs 620b in each real block 612b with a 1 second I-frame interval resulting in a 3 second block size. The packaged stream 610c may have a 1 mbps bitrate and may include 2 GOPs 620c in each real block 612c with a 1 second I-frame interval resulting in a 2 second block size. The packaged stream 610d may have a 400 kbps bitrate and may include 2 GOPs 620d in each real block 612d with a 0.5 second I-frame interval resulting in a 1 second block size. The packaged stream 610e may have a 200 kbps bitrate and may include 3 GOPs 620e in each real block 612e with a 0.5 second I-frame interval resulting in a 1.5 second block size.

As shown in FIG. 6, the onboarding packaged stream 610f may have a 200 kbps bitrate and may include 1 GOP 620f in each real block 612f with the 0.5 second I-frame interval resulting in a 0.5 second block size. Because the onboarding packaged stream 610f has fewer GOPs (e.g., 1 GOP 620f) in a real block 612f than the number of GOPs (e.g., 3 GOPs 620e) in a real block 612e of the packaged stream 610e and because the two packaged streams 610e-f have equivalent I-frame intervals and bitrates, the block size (e.g., 0.5 seconds) of the real blocks 612f may be less than the block size (e.g., 1.5 seconds) of the real blocks 612e.

As a result, the client device 618f using the onboarding packaged stream 610f may have a lower latency time than a latency time of client device 618e using the packaged stream 610e. For example, a client device 618 may have a preset minimum number of blocks it may buffer prior to initiating playback of content. The client devices 618f may be able to download/buffer its preset number of blocks from the onboarding packaged stream 610f more quickly than client devices 618e may be able to download/buffer its preset number of blocks from the packaged stream 610e because of the smaller block size of the onboarding packaged stream 610f. Thus, the client device 618f may begin playback of content more quickly if it is using the onboarding packaged stream 610f rather than the packaged stream 610e. In some instances, the client devices 610f may have a stable connection with a lower resolution screen. Additionally or alternatively, in some embodiments, the dynamic block controller 122 might not generate the one or more onboarding streams. In such embodiments, the dynamic block controller 122 may adjust the streams 608 generated by the transcoder 604 and/or the corresponding packaged streams 610.

In step 320, the dynamic block controller 122 may, via a packager (e.g., the packager 506), interleave blank blocks with real blocks based on the actual minimum amount of content for the client device to buffer prior to initiating content playback (to permit the client device to play the content uninterrupted for a predetermined period of time). For example, in step 320, the dynamic block controller 122, using an algorithm that accounts for the actual minimum number of real blocks and/or amount of content data, may determine a number of blank blocks to interleave with the real blocks. The dynamic block controller 122 may also, using the algorithm, determine where each blank block will be inserted in the onboarding stream of real blocks (or in the one of the main streams). For example, the dynamic block controller 122 may insert the blank blocks at a particular interval (e.g., after each real block, after every two blocks, or any other interval). For example, as shown in FIG. 5, in main stream 510a, the dynamic block controller 122 via the packager 506 has inserted blank blocks 512a after each real block 514a. Similarly, in main stream 510d, the dynamic block controller 122 via the packager 506 has inserted a blank block 512d after every two sequential real blocks 514d.

As discussed above, due to the client device's 518 preset policy of not permitting and/or otherwise allowing playback of the received content to begin until the preset number of blocks in a stream have been buffered by the client device, the client devices 518a-e may only initiate playback of the content once the preset minimum number of block have been received/downloaded from the packager over the network 400. However, because many of the blocks received in the packaged streams 510a-e include blank blocks and the blank blocks may be downloaded faster by the client devices 518a-e (e.g., because they have a zero payload or a payload below a threshold payload size), the client devices 518a-e may download and/or otherwise receive the preset number of minimum blocks faster than if each of the blocks were real blocks of a preset size as is the case in conventional systems. As a result, the latency time (e.g., the delay or time difference between the time at which the client devices 518a-e begin receiving the packaged streams 510a-e and the time at which the client devices 518a-e begin playback of the content contained within the packaged streams 510a-e) may be less than the latency time of conventional systems.

In some embodiments, the dynamic block controller 122 may determine the preset minimum number of blocks the client device is to receive prior to initiating playback of content. For example, the dynamic block controller 122 may send to the client device a request for its preset minimum number of blocks and, in response, may receive the client device's preset minimum number of blocks. Additionally or alternatively, in some instances, the dynamic block controller 122 may query a database of the local office for the preset minimum number of blocks for the client device. In such embodiments, the dynamic block controller 122 may set the total number of blocks of an initial portion of the stream to be equivalent to the preset minimum number of blocks of the client device. The initial portion of the stream may include the real blocks and the blank blocks. The dynamic block controller 122 may set the total number of blocks of each subsequent portion of the stream to be equivalent to the preset minimum number of blocks.

In step 325, the dynamic block controller 122 may, via the transcoder and/or packager, dynamically adjust block size of real blocks. For example, in step 325, the dynamic block controller 122 may, using the network and transcoder forecast and/or the actual minimum amount of real blocks and/or content data determined in step 310, dynamically (e.g., on a block-by-block basis) adjust (e.g., increase or decrease) the block size of the real blocks for client devices. For example, a first real block of a stream may have 3 GOPs while the second subsequent real block of the stream may have 2 GOPs and the third subsequent real block of the stream may have 4 GOPs.

As noted above, the block size of a real block may be a time-based measurement. The time-based measurement may correlate to an amount of content data within the real block. Thus, by adjusting the block size of a real block, the amount of content data in the real blocks may also be adjusted. Because the block size of a real block correlates to the number of GOPs within the real block and its associated I-frame interval, the block size may be adjusted (e.g., increased or decreased) by, for example, adjusting the number of GOPs within the real block, adjusting its associated I-frame interval, and/or any other method of adjusting the block size. The I-frame interval may be a time-based interval at which I-frames are packaged/inserted into the stream. The I-frame interval may correlate to a GOP size (e.g., a time-based duration of a GOP that may correlate to an amount of content data within the GOP).

As an example, the dynamic block controller 122 may lower the I-frame interval (e.g., lower the time period between I-frames) and/or lower the number of GOPs per block as a client device 618 nears a bitrate transition period (e.g., when the client device 618 is within a predetermined time-based value of the bitrate transition period). The bitrate transition period may be a period in which the client device switches from a first stream having a first bitrate to a second stream having a second bitrate different from the first bitrate. In some embodiments, the dynamic block controller 122 may lower the I-frame interval and/or decrease the number of GOPs per block in response to a change in network conditions and/or in response to predicted future change in network conditions (e.g., within a predetermined time period). In some embodiments, the dynamic block controller 122 may increase the I-frame interval (e.g., increase the time period between I-frames) and/or increase the number of GOPs per block when there is a stable connection between the packager and the client device in order to reduce overhead. In some embodiments, when the dynamic block controller 122 determines to increase or decrease the block size (e.g., I-frame interval and/or number of GOPs per block), the increase or decrease may occur on one or more streams 508, 608, 510, 610.

In an example embodiment, the dynamic block controller 122 may reduce the block size of one or more real blocks 612a. For example, the dynamic block controller 122 may reduce the 4.5 second block size of the real block 612a to a 3 second block size by maintaining, via the transcoder 604, the 1.5 second I-frame interval and by reducing, via the packager 606, the number of GOPs 620a in the real block 612a from 3 GOPs to 2 GOPs. Additionally or alternatively, in some embodiments, the dynamic block controller 122 may reduce the 4.5 second block size of the real block 612a to a 1.5 second block size by maintaining, via the packager 606, the 3 GOPs 620a in the real block 612a and by reducing, via the transcoder 604, the 1.5 second I-frame interval to a 0.5 second I-frame interval. As a result, the real block 612a may have a reduced size enabling a faster download by the client device 618a thereby reducing the latency period to initiate initial playback of the content.

In another example embodiment, the dynamic block controller 122 may increase the block size of one or more real blocks 612a. For example, the dynamic block controller 122 may increase the 4.5 second block size of the real block 612a to a 6 second block size by maintaining, via the transcoder 604, the 1.5 second I-frame interval and by increasing, via the packager 606, the number of GOPs 620a in the real block 612a from 3 GOPs to 4 GOPs. Additionally or alternatively, in some embodiments, the dynamic block controller 122 may increase the 4.5 second block size of the real block 612a to a 6 second block size by maintaining, via the packager 606, the 3 GOPs 620a in the real block 612a and by increasing, via the transcoder 604, the 1.5 second I-frame interval to a 2 second I-frame interval. As a result, the real block 612a may have an increased size resulting in a slower download time by the client device, which may increase the latency period to initiate initial playback of the content. However, in some instances, a longer latency period may be beneficial in order to buffer enough content to avoid interrupting playback of the content when, for example, the network 400 is substantially overloaded and/or the transcoder system 500, 600 is not optimal. While the above examples relate to stream 608a and packaged stream 610a, the dynamic block controller 122 may similarly adjust the other stream 608b-e and packaged streams 610b-e as well as any onboarding streams (e.g., the onboarding packaged stream 610f).

In step 330, the dynamic block controller 122 may provide the onboarding stream masked as the requested stream to the requesting client device. For example, in step 330, the dynamic block controller 122 may, in response to receiving the request for 400 kbps stream in step 305 (e.g., the 400 kbps packaged stream 610d), determine that providing the 400 kbps packaged stream 610d may result in an unnecessarily long latency time (e.g., a latency time above a threshold value) based on the predicted network and transcoder QoS forecast and/or the actual minimum amount of content data determined in step 310. In response to such a determination, the dynamic block controller 122 may provide an onboarding stream that has a different bitrate based on the predicted network and transcoder QoS forecast and/or the actual amount of minimum content data. For example, the dynamic block controller 122 may send onboarding packaged stream 610f having a 200 kbps bitrate as the optimum stream to provide to the requesting client device. In instances where an onboarding stream was not generated, the dynamic block controller 122 may select another main stream to mask as the requested stream. For example, the dynamic block controller 122 may select packaged stream 610e having a 200 kbps bitrate as the optimum stream to provide to the requesting client device.

As noted above, the dynamic block controller 122 may mask the onboarding stream as the requested stream. In other words, the dynamic block controller 122 may provide the onboarding stream to the client device in such a manner that the selected stream appears to the requesting client device to be the requested stream. For example, the dynamic block controller 122 may mask the onboarding packaged stream 610f as the requested 400 kbps packaged stream 610d such that the masked packaged stream 610f may appear to the client device as the requested 400 kbps packaged stream 610d. The dynamic block controller 122 may mask a stream by, for example, providing false headers, metadata, and/or other identifying information to indicate that the selected stream is the requested stream. The dynamic block controller 122 may then provide and/or otherwise make available the masked selected stream to the requesting client device 618 for download. As a result of downloading the content data using the masked onboarding stream, the latency time is reduced (e.g., lower than a latency time would otherwise be if the content data was downloaded by the client device using the requested stream).

In some embodiments, the dynamic block controller 122 may mask the onboarding stream as the requested stream when e.g., the requested stream might not be available under the transcoding-on-demand architecture while the onboarding stream may be available.

In one example, a client device may request a stream having a 1 mbps bitrate. The dynamic block controller 122 may mask and provide a first masked stream (e.g., a main stream or an onboarding stream) with a lower or lowest bitrate (e.g., 400 kbps) based on the predicted network and transcoder QoS forecast. This masked stream may be provided until the receiving client device begins content playback. At that point, the dynamic block controller 122 may provide a second masked stream having a slightly higher bitrate (e.g., 800 kbps) interleaved with the first masked stream. In other words, blocks at the 400 kbps bitrate may be interleaved with blocks at the 800 kbps bitrate. The dynamic block controller 122 may continue to interleave masked streams with a gradually higher bitrate until the 1 mbps requested bitrate is achieved for a predetermined duration of time. At that point, the dynamic block controller 122 may simply provide the requested stream at the 1 mbps bitrate. The above example is analogous to the blank blocks example with blocks at different bitrates being substituted for the blank blocks.

A masked stream provided to the client device may also include the interleaved blank blocks and/or dynamically adjust blocks as discussed above in steps 320 and 325. As a result, the dynamic block controller 122 may reduce the latency time for client device to begin playback by manipulating a stream provided to the client device. For example, the dynamic block controller 122 may reduce the latency time by interleaving blank blocks in the provided stream, dynamically adjusting the block size of real blocks in the provided stream, and/or masking the provided stream as a requested stream with the provided stream having a lower bitrate than the requested stream. Each of the aforementioned actions by the dynamic block controller 122 may account for and/or otherwise be based on the predicted network and transcoder QoS forecast.

In step 335, the dynamic block controller 122 may gradually decrease a number of blank blocks interleaved with the real blocks for the subsequent portion of the stream (e.g., after content playback begins). For example, in step 335, the dynamic block controller 122 may then, using an algorithm, gradually reduce the number of inserted blank blocks (e.g., inserting the blank blocks at longer intervals than the interval initially selected) until eventually no more blank blocks are inserted into the stream provided to the client device. In some instances, the gradual reduction of inserting of blank blocks may not exceed a predetermined rate. As a result, in some embodiments, the client device may eventually receive just the real blocks. For example, the dynamic block controller 122 may, in step 320, insert blank blocks at short intervals for an initial (e.g., starting) portion of a stream, the dynamic block controller 122 may then, in step 335, insert blank blocks at longer intervals for the subsequent portion of the stream. For example, a shorter interval may be one block (i.e., where a blank block has been inserted after each real block for an initial portion of the stream) and a longer interval may be two blocks (e.g., where a blank block is inserted after every two sequential real blocks for a sequentially subsequent portion of the stream). The dynamic block controller 122 may for a next sequentially subsequent portion of the stream insert the blank blocks at an even longer interval greater than the e.g., the two block interval and so on until eventually only real blocks are streamed to the client device. In other words, the dynamic block controller 122 might not insert any blank blocks into the stream at that point.

While the gradual reduction in the number of blank blocks interleaved with real blocks as discussed above may be done for recorded streams, the gradual reduction of blank blocks in live streams may also be accomplished. For example, packagers store a set amount or number of blocks that are available for client devices to download. When a new block is packaged, the oldest block is removed. If a packager offers the latest block to the client device during this onboarding process (e.g., the initial period of the stream during which blank blocks are inserted), then the client device may be synchronized with the latest blocks as they are packaged since packaging happens at 1× speed and playback mirrors that 1× speed. In some instances, there might not be new real blocks to buffer since the client device is already downloading the latest block. In other words, the client device may attempt to buffer content that is not yet available. In such instances, since the packager may contain at least 30 seconds of blocks, when the client device launches the initial stream, the latest block might not be offered to the client device. Instead, a block that is not the latest block (e.g., a block that may be 15 or 20 seconds old) may be offered to the client device. In one example, a client device that requires 10 blocks before playback may be offered blocks T−15 through T−10 (where T represents time of the live TV), with 5 interleaved blank blocks. As a result, as the blank blocks are reduced in frequency, the client device may eventually have T−15 through T−5 in its buffer. Alternatively, in some embodiments, the client device may slow down playback (e.g., to 0.95× speed) to result in the stream being behind live TV, which would leave at least one additional block available in the buffer of the client device thereby enabling playback of the content without interruption.

The dynamic block controller 122 may insert the blank blocks for subsequent portions of the stream at positions different from corresponding positions in a prior (e.g., initial) portion of the stream. For example, if the initial portion of the stream has 10 blocks and an interval of one block, then the first, third, fifth, seventh, and ninth block positions may be filled with real blocks and the second, fourth, sixth, eighth, and tenth block positions may be filled with blank blocks. If a second portion of the stream also has 10 blocks and an interval of two blocks, then the first, second, fourth, fifth, seventh, eight, and tenth block positions may be filled with real blocks while the third, sixth, and ninth block positions may be filled with blank blocks. In this instance, the second block in the initial portion of the stream may be a blank block while the second block in the sequential second portion of the stream may be a real block. Similarly, in this instance, the third block in the initial portion of the stream may be a real block while the third block of the in the sequential second portion of the stream may be a blank block. In some embodiments, a total number of blocks (e.g., real blocks plus blank blocks) in the initial portion of the stream may be equivalent to a total number of blocks of a subsequent portion (e.g., a sequentially second portion) of the stream.

By gradually (e.g., below a predetermined insertion or interleaving rate) reducing the number of blank blocks, the dynamic block controller 122 avoids an instance where the client device incorrectly selects a lower bitrate feeds shortly after playback begins. For example, after the client device begins playback (e.g., after the client device buffers 10 blocks in instances where its preset minimum number of block is 10 blocks), the client device may continue to choose blocks based on the bandwidth available to the client device and how many blocks may be currently in its buffer. In instances where the buffer is near empty (e.g., contains a number of blocks below a predetermined threshold number of blocks), the client device may select a lower bitrate feed to compensate. As a result, when using a system where blank blocks may be inserted into the stream, the client device might not understand the use of these blank blocks and, thus, may incorrectly select a stream with a lower bitrate shortly after playback begins. For example, after the client device plays blocks 1-4, the client device has only played 2 seconds of content assuming the real blocks have a block size of 1 second. As a result, this only gives the client device half of time it was expecting to buffer blocks 11-14. In order to avoid bitrate compensation by the client device (e.g., in order to avoid or prevent the client device from switching to a lower bitrate stream), the dynamic block controller 122 may continue to insert blank blocks into the stream after playback has begun. For example, blocks 11-20 may include 4 blank blocks and blocks 21-30 may include 3 blank blocks and so on. Accordingly, the client device may more easily catch up without suddenly adjusting the quality of the video (e.g., without switching to a lower bitrate stream).

In step 335, the dynamic block controller 122 may gradually adjust (e.g., increase) the block size of the blocks after content playback begins. For example, in step 335, the dynamic block controller 122 may, using an algorithm, gradually increase the block size of blocks 612 (i.e., increase the amount of content data in each of the blocks 612) of the stream 610 used by the client device 618 to download the content data. In some embodiments, the dynamic block controller 122 may increase the block size until a predetermined block size is reached (e.g., a preset standard block size). In some instances, the gradual increase in the block size may not exceed a predetermined rate. Accordingly, the client device may eventually receive blocks of the preset standard block size in the stream.

As discussed above, the client device may perform bitrate compensation when, for example, the client device determines that it is falling behind in buffering blocks. In order to avoid and/or prevent the client device from switching to a lower bitrate stream, the dynamic block controller 122 may decrease the block size as discussed above to enable the buffer of the client device to keep up with the stream. By decreasing the block size, less bandwidth may be used to buffer the same number of blocks.

In step 340, the dynamic block controller 122 may, during the initial portion and/or during subsequent portions of the stream, adjust the interleave interval based on an updated predicted network and transcoder QoS forecast and/or client feedback. For example, in step 340, the dynamic block controller may continuously and/or intermittently (e.g., at preset intervals) monitor and/or otherwise update the network conditions of the network 400 and the transcoder conditions of e.g., the transcoder system 500 in a similar manner to that discussed above in step 310. Additionally, in some embodiments, the dynamic block controller 122 may, using the updated predicted network and transcoder QoS forecast, update the actual minimum number of real blocks for the client device to buffer prior to initiating uninterrupted playback when playback has not yet begun. The dynamic block controller 122 may then adjust the interleaving of the blank blocks in steps 320 and/or 335 based on the updated actual minimum number of real blocks. For example, in response to a determination that the updated actual minimum number of real blocks has increased, the dynamic block controller 122 may decrease the number of blank blocks interleaved with the real blocks (e.g., by increasing the insertion interval of the blank blocks). For example, in response to a determination that the updated actual minimum number of real blocks has decreased, the dynamic block controller 122 may increase the number of blank blocks interleaved with the real blocks (e.g., by decreasing the insertion interval of the blank blocks).

Additionally or alternatively, in some embodiments, one or more of the client devices 518 may send feedback to the dynamic block controller 122. The feedback may include, for example, how often the client device is switching between streams at different bitrates, how many blocks/time is buffered by the client device, the bitrate of the stream currently used by the client device, the network conditions experienced by the client device, the average time the client device takes to download one block (e.g., using a weighted moving average), and/or the like. Using the feedback from the client device, the dynamic block controller 122 may adjust the number of blank blocks being interleaved with the real blocks and/or may adjust the block size of the real blocks.

In step 340, the dynamic block controller 122 may, at any point in time, adjust the block size based on updated predicted network and transcoder QoS forecast and/or client feedback. For example, in step 340, the dynamic block controller 122 may continuously and/or intermittently (e.g., at preset intervals) monitor and/or otherwise update the network conditions of the network 400 and the transcoder conditions of e.g., the transcoder system 600 in a similar manner to that discussed above in step 305. Additionally, in some embodiments, the dynamic block controller 122 may, using the updated predicted network and transcoder QoS forecast, update the actual minimum number of real blocks for the client device to buffer prior to initiating uninterrupted playback when playback has not yet begun. The dynamic block controller 122 may adjust (e.g., increase or decrease) the block size based on the updated information. For example, in response to a determination that the predicted network and transcoder QoS forecast is below a predetermined quality of service metric (e.g., the network is congested), the dynamic block controller 122 may increase the block size of the real blocks. For example, in response to a determination that the predicted network and transcoder QoS forecast is above a predetermined quality of service metric (e.g., the network is uncongested), the dynamic block controller 122 may decrease the block size. The dynamic block controller 122 may adjust the block size using any method described herein including, for example, adjusting the number of GOPs in one or more blocks, adjusting an I-frame interval (e.g., a GOP size), or the like.

As discussed above in steps 335 and 340, the dynamic block controller 122 may adjust the block size of one or more blocks based on an algorithm to determine the block size in time. In some instances, the block size in time may be governed initially by the following algorithmic formula:

$$\text{Initial Block Size} = \frac{\text{Initial Recommended Length of Time to Buffer}}{\text{Preset Minimum Number of Blocks Before Client Playback}}$$

The dynamic block controller 122 may determine the initial recommended length of time to buffer from a video service associated with the content and/or the predicted network and transcoder QoS forecast. The initial block size may be a time-based measurement (e.g., in seconds). As discussed above, the dynamic block controller 122 may dynamically adjust the block size according to an algorithm, which may be governed by the following algorithmic formula:

$$\text{Block Size} = c + \frac{t}{w} * (r - c)$$

where c may represent the initial block size determined above (e.g., at time 0, which prior to transition to a long term block size), t may represent a current time within a window (e.g., if there are 9 seconds to playback transition, the current time within the window begins at time=0, 1 second into the transition window t=1, etc.), w may represent the transition window time (e.g., if there are 9 seconds until transition from onboarding to long term, then w equals 9), and r may represent the current long term recommended block size in time (e.g., after onboarding or after starting content playback). The dynamic block controller 122 may determine r from a video service and/or based on the predicted network and transcoder QoS forecast. The algorithm enables the dynamic block controller 122 to optimally adjust the blocks size during transitioning from the onboarding of a new client device to the recommended length blocks in time and/or due to a change in the predicted network and transcoder QoS forecast.

In an example embodiment, the initial block size c may be 1 second, the recommended length of blocks r may be 2 seconds, and the transition window w may be 9 seconds. In such an embodiment, the following table may represent the application of the algorithmic formula.

| Time | Formula Application | Resulting Block Size |
|------|---------------------|----------------------|
| 0 | 1 + (0/9)*(2 − 1) | 1 |
| 1 | 1 + (1/9)*(2 − 1) | 1.111 |
| 2 | 1 + (2/9)*(2 − 1) | 1.222 |
| 3 | 1 + (3/9)*(2 − 1) | 1.333 |
| 4 | 1 + (4/9)*(2 − 1) | 1.444 |
| 5 | 1 + (5/9)*(2 − 1) | 1.555 |
| 6 | 1 + (6/9)*(2 − 1) | 1.666 |
| 7 | 1 + (7/9)*(2 − 1) | 1.777 |
| 8 | 1 + (8/9)*(2 − 1) | 1.888 |
| 9 | 1 + (9/9)*(2 − 1) | 2 |

For example, when the current time t equals 3 seconds, then the block size (e.g., timeframe) of new blocks may be 1+(3/9)*(2−1)=1.3333 seconds. Similarly, when the current time t equals 6 seconds, then the block size of new blocks may be 1+(6/9)*(2−1)=1.6666 seconds. Similarly, when the current time t equals 9 seconds, then the block size of new blocks may be 1+(9/9)*(2−1)=2 seconds.

In some embodiments, the dynamic block controller 122 may apply a similar algorithm in instances when the dynamic block controller 122 might not adjust the block size exactly to the optimum block size (e.g., in instances where the block size is static and/or otherwise fixed). In an instance where the blocks size may be statically 1 second and following the above example, the resulting block size of the table above may be considered the amount of time the dynamic block controller 122 has determined the client device is to buffer/download at a given time t. Additionally, because the block size is statically set at 1 second in this instance, the dynamic block controller 122 may determine how many blocks the client device is to buffer/download at each time t. In other words, after each block size time interval of 1 second, the dynamic block controller 122 may determine n (e.g., how many blocks to buffer/download) based on the following algorithmic formulas:

$$n = (w-a) \text{ rounded up to nearest block size}$$

$$a = \text{previous}(n) - \text{previous}(w-a)$$

where w may be the wanted block size (e.g., the resulting block size of the table above), a may be the amount of time "ahead" (e.g., buffered or downloaded by the client device since last timeframe) and n may be the number of blocks downloaded/buffered by the client device. If n does not work out to an integer value (e.g., a whole number without a fractional component), then n is rounded up to the nearest block size. The element w-a may be referred to as the adjusted wanted block size or adjusted wanted amount. Applying the above formulas to the above table results in the following table:

| t | w | previous(w − a) | previous(n) | a | w − a | n |
|---|---|---|---|---|---|---|
| 0 | 1 | 0 | 0 | 0 | 1 − 0 = 1 | 1 |
| 1 | 1.111 | 1 | 1 | 1 − 1 = 0 | 1.111 − 0 = 1.111 | 2 |
| 2 | 1.222 | 1.111 | 2 | 2 − 1.111 = 0.888 | 1.222 − 0.888 = 0.333 | 1 |
| 3 | 1.333 | 0.333 | 1 | 1 − 0.333 = 0.666 | 1.333 − 0.666 = 0.666 | 1 |
| 4 | 1.444 | 0.666 | 1 | 1 − 0.666 = 0.333 | 1.444 − 0.333 = 1.111 | 2 |
| 5 | 1.555 | 1.111 | 2 | 2 − 1.111 = 0.888 | 1.555 − 0.888 = 0.666 | 1 |
| 6 | 1.666 | 0.666 | 1 | 1 − 0.666 = 0.333 | 1.666 − 0.333 = 1.333 | 2 |
| 7 | 1.777 | 1.333 | 2 | 2 − 1.333 = 0.666 | 1.777 − 0.666 = 1.111 | 2 |
| 8 | 1.888 | 1.111 | 2 | 2 − 1.111 = 0.888 | 1.888 − 0.888 = 1 | 1 |
| 9 | 2 | 1 | 1 | 1 − 1 = 0 | 2 − 0 = 2 | 2 |

For example, when t equals 2 seconds, the dynamic block controller 122 may determine that the optimum block size (e.g., a wanted block size w) may be 1.222 seconds, the previous(w−a) may be 1.111, and the previous n may be 2. The dynamic block controller 122 may calculate that amount of time a the client device is ahead (e.g., amount buffered beyond the optimum or wanted amount, which in this instance may be 0.888 seconds). The dynamic block controller 122 may then calculate the adjusted wanted block size or amount w−a, which in this instance may be 0.333 seconds. Because the block size is statically 1 second in this example, the dynamic block controller 122 may round 0.333 seconds to 1 second to determine the number of blocks the client device is to buffer/download (e.g., 1 block).

For example, when t equals 7 seconds, the dynamic block controller 122 may determine that the optimum block size (e.g., wanted block size w) may be 1.777 seconds, the previous(w−a) may be 1.333, and the previous n may be 2. The dynamic block controller 122 may calculate that amount of time a the client device is ahead (e.g., amount buffered beyond the optimum or wanted amount, which in this instance may be 0.666 seconds). The dynamic block controller 122 may then calculate the adjusted wanted block size or amount w−a, which in this instance may be 1.111 seconds. Because the block size is statically 1 second in this example, the dynamic block controller 122 may round 1.111 seconds to 2 seconds to determine the number of blocks the client device is to buffer/download (e.g., 2 blocks).

As can determined from the table above, when t equals 9 seconds (e.g., the transition window time), the optimum (e.g., wanted) block size may be an exact multiple of the static block size. For example, the optimum block size may be 2 seconds and the static block size may be 1 second and, thus, the amount of time the dynamic block controller 122 wants the client device to buffer equals the amount of time the client device is actually able to buffer. As a result, there might not be a time by which the client device is ahead (e.g., a may equal 0). In some instances, this may work out to the amount of time the client device is ahead from the last timeframe plus blocks downloaded since last timeframe minus block size in time.

In step 345, in instances where an onboarding stream is generated, the dynamic block controller 122 may adjust the onboarding stream to align the onboarding stream with one of the main streams thereby creating transition points as will be discussed in detail below. This allows the client device to switch from the onboarding stream to the main stream without interruption in content playback.

While the steps of FIG. 3 are shown in one order, the steps of FIG. 3 may be performed in any other order. For example, step 310 may be performed before step 305 and step 325 may be performed before step 320. Additionally, in some embodiments, one or more of the steps in FIG. 3 may be optional and, in some instances, might not be performed. For instance, in one or more arrangements, step 320 might not be performed.

Figure 7:
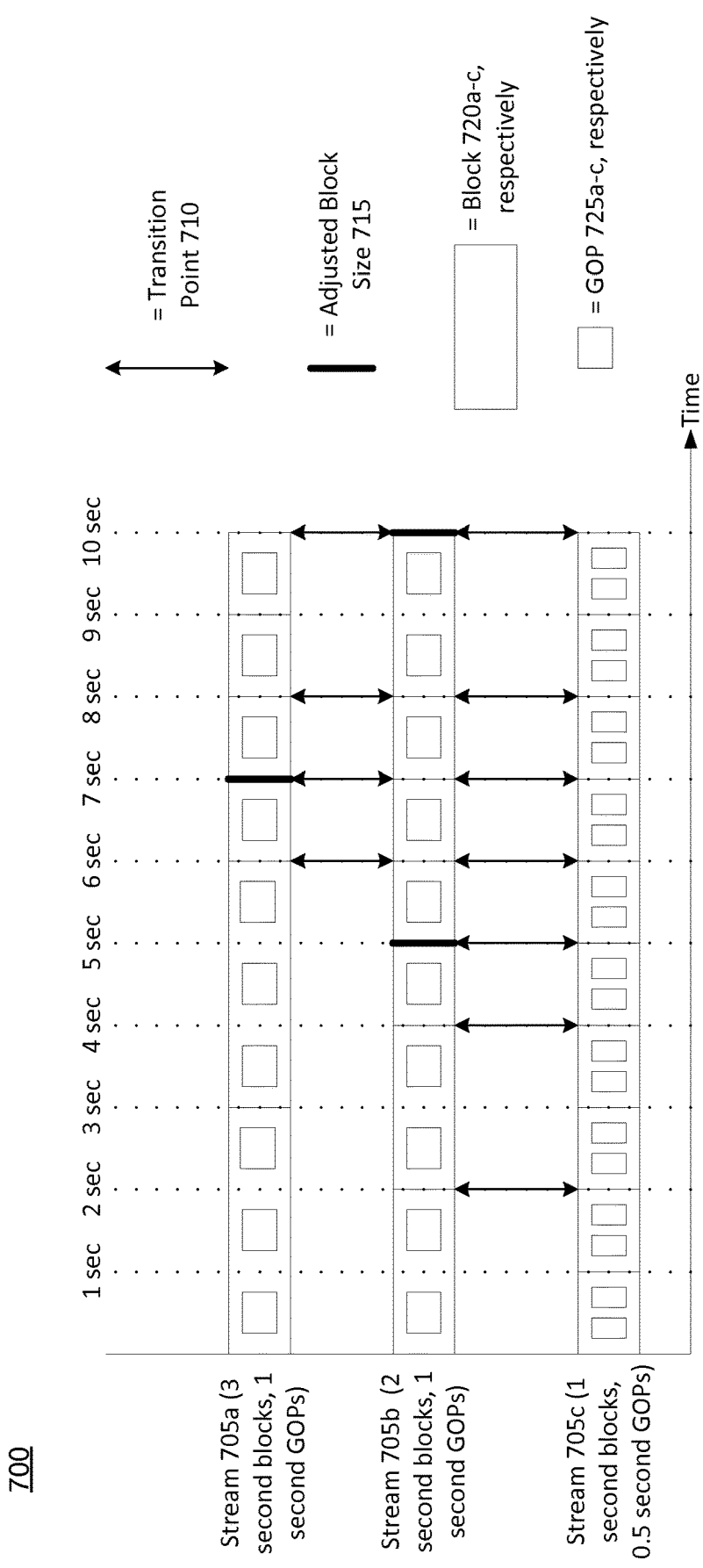
FIG. 7 illustrates an example time-based graph showing alignment of various streams at different bitrates in accordance with one or more illustrative aspects discussed herein.

FIG. 7 illustrates an example time-based graph showing alignment of various streams at different bitrates in accordance with one or more illustrative aspects discussed herein. FIG. 7 illustrates 3 streams 705*a-c* along a time-based axis showing one or more transition points 710 at which a client device may switch from one stream to another stream without causing an interruption during content playback. The streams 705*a-c* may include one or more blocks 720 having one or more GOPs 725*a-c*. A dynamic block controller 122 may adjust the block size of the streams 705*a-c* as shown by the adjusted block size 715.

Figure 8:
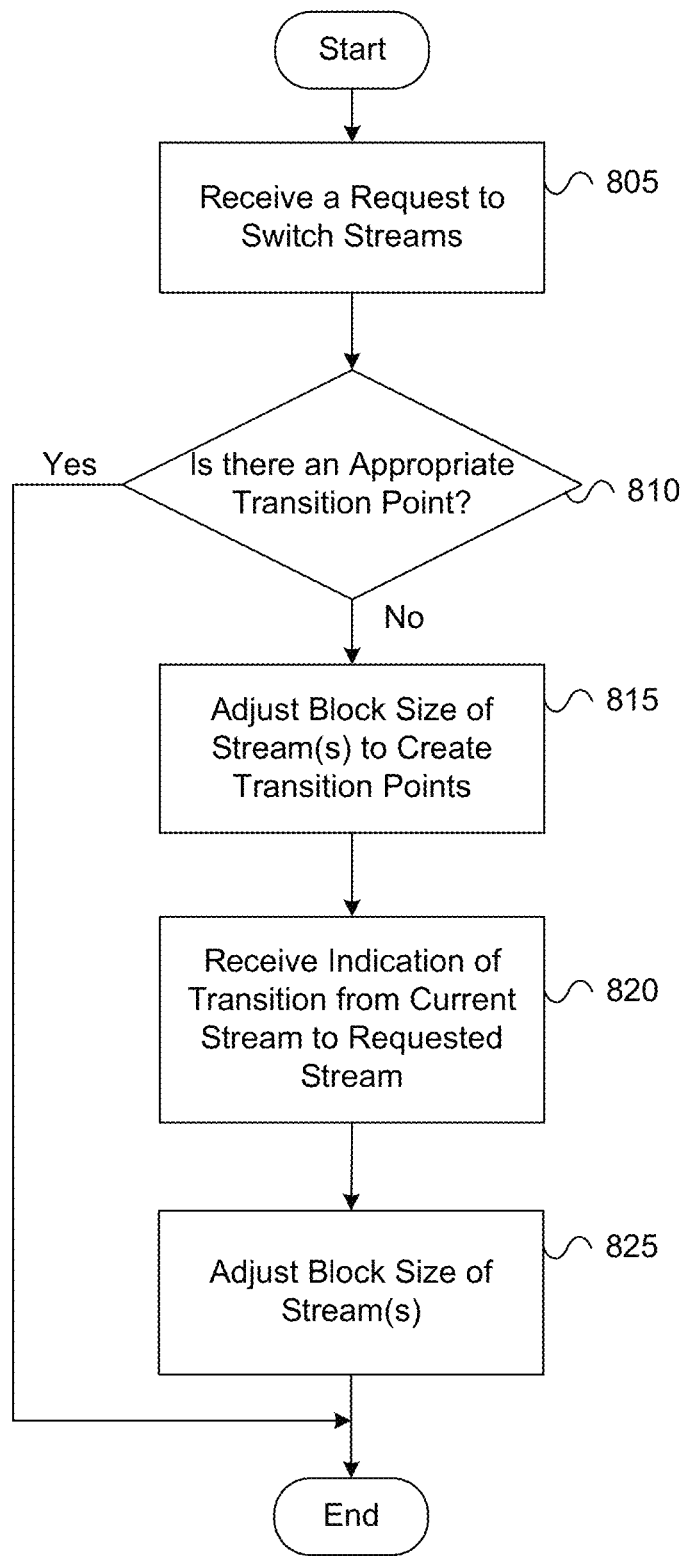
FIG. 8 illustrates a flowchart of an example of a method of aligning various streams at different bitrates in accordance with one or more illustrative aspects discussed herein.

FIG. 8 depicts a flowchart of an example method of aligning various streams at to permit client devices to move between streams in accordance with one or more illustrative aspects discussed herein. In one or more embodiments, the method of FIG. 8 and/or one or more steps thereof may be performed by a computing device (e.g., computing device 200). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which a dynamic block controller 122 may receive a request to switch streams/feeds. For example, in step 805, the dynamic block controller 122 may receive from a client device a request to switch from a current stream (e.g., stream 705*c*) to a new stream (e.g., stream 705*b*) as shown in the illustrative time-based alignment graph of FIG. 7. In some embodiments, the current stream and the new stream may have different bitrates. In other embodiments, the current stream and the new stream have the same bitrate. In some embodiments, the current stream and/or the new stream may be an onboarding packaged stream as discussed above.

In step 810, the dynamic block controller 122 may determine if there is an appropriate transition point between the current stream and the new steam. A transition point may be, for example, a point in time at which one or more streams align such that the client device may switch from one stream to another stream without causing an interruption in playback of content data. For example, a transition point may be, for example, when two streams each the start/end of respective blocks aligned at a point in time so that when a client device transitions from the current stream to the new stream, the client device will begin downloading from the new stream at the start of the next block. As a result, after the client device begins downloading from the new stream, the first data downloaded is an I-frame. Otherwise, if two streams are not aligned and the client device switches from the first stream to the second stream, the client device might not receive an I-frame until from the new stream after it has received B-frames and/or P-frames to which no reference I-frame has been downloaded (i.e., the client device may receive a B-frame or a P-frame first). Thus, in such a scenario, the client device will have an interruption in playback (e.g., the client device may be unable to display content) during the time period in which playback of those B-frames and/or P-frames are being played by the client device (again, because no associated reference I-frame for those B-frames and/or P-frames has been received by the client device). The interruption may continue until the client device receives the start of the next block (i.e., until the client device receives the next I-frame) from the new stream. In such cases, the client device may request overlapping blocks of two different streams, and as long as the GOPs of the two streams aligned the client device may transition between the streams. Even if the GOPs of the two streams did not align, the client device transition to one of streams at that stream's first available GOP and may playback content from that point.

The dynamic block controller 122 may determine whether there is an appropriate transition point for the client device to switch from the current steam to the new stream without causing an interruption when playing back the content. An appropriate transition point may be a transition point within a predetermined period of time from the time the request to switch streams was received by the client device. In response to a determination that there is an appropriate transition point (e.g., a transition point within the predetermine period of time), the dynamic block controller 122 might not take action because the client device may switch streams without causing interruption in content playback. However, in response to a determination that there is not an appropriate transition point (e.g., there is no transition point or there is not a transition point within the predetermined period of time), the dynamic block controller 122 may prevent an interruption in content playback by performing steps 815-825.

In step 815, the dynamic block controller 122 may adjust a block size of one or more streams to create transition points. For example, the dynamic block controller 122 may adjust the block size of the current stream and/or the block size of the new stream to align the two streams. The block size may be adjusted by, for example, adjusting the number of GOPs in one or more blocks of a stream, adjusting a GOP size of one or more GOPs, adjusting an I-frame interval, and/or any other method of adjusting the block size discussed herein.

For example, as shown in FIG. 7, the dynamic block controller 122 may, at time 5 seconds, adjust the block size of stream 705*b* to align stream 705*b* with stream 705*c*. For example, the dynamic block controller 122 may, at time 5 seconds, adjust the block size of stream 705*b* from a 2 second block size to a 1 second block size to match the 1 second block size of stream 705*c* by e.g., having a packager block every GOP 725*b* rather than every two GOPs 725*b*. As a result, beginning at time 5 seconds, streams 705*b* and 705*c* may be aligned and may include transition points 710 that occur at the start/end of each block of the streams 705*b* and 705*c*. For example, transition points 710 may now occur at times: 5 seconds, 6 seconds, 7 seconds, 8 seconds, and so on.

For example, the dynamic block controller 122 may, at time 7 seconds, adjust the block size of stream 705a to align with streams 705b and 705c. For example, the dynamic block controller 122 may, at time 7 seconds, adjust the block size of stream 705a from a 3 second block size to a 1 second block size, e.g., by having the packager block every GOP 725a rather than every three GOPs 725a, to match the 1 second block size of streams 705b and 705c. As a result, beginning at time 7 seconds, the streams 705a-c may be aligned and may include transition points 710 that occur at the start/end of each blocks 720a-c. For example, transition points 710 may now occur at times: 7 seconds, 8 seconds, and 10 seconds.

In step 820, the dynamic block controller 122 may receive an indication of transition from a current stream to a requested stream. For example, in step 820, the dynamic block controller 122 may receive from the client device an indication that the client device has switched from the current stream (e.g., stream 705b) to the new stream (e.g., stream 705c).

In step 825, the dynamic block controller 122 may adjust the block size of one or more of the streams. For example, in step 825, after receiving an indication that the client device has switched from the current stream to the new stream, the dynamic block controller 122 may adjust the block size of the current stream and/or the new stream to, for example, their respective previous block size and/or any other block size. For example, after the client device switches from stream 705c to stream 705b, the dynamic block controller 122 may increase the block size of stream 705b from the 1 second block size to its previous 2 second block size as shown in FIG. 7 at time 8 seconds.

In some embodiments, the block size of the streams may be adjusted to frequently align the streams (i.e., create more transition points) to enable the client device to more quickly switch to a more optimum bitrate stream based on the predicted network and transcoder QoS forecast.

In some embodiments, rather than performing steps 815-825, there may be a separate "transitioning" stream that may be used for to aid a client device in switching between streams. For example, a client device may wishes to switch from a first stream (e.g., an onboarding stream) to a second stream (e.g., a main stream). A transitioning stream may be generated and adjusted to align and/or create transition points with the first stream. The client device may then switch from the first stream to the transitioning stream. The transitioning stream may then be adjusted to align and/or create transition points with the second stream. The client device may then switch from the transitioning stream to the second stream. This methodology allows for the client device to switch between the first stream and the second stream without having to adjust the first or second stream. As a result, other client devices requesting either the first stream or the second stream may be unaffected.

Figure 9:
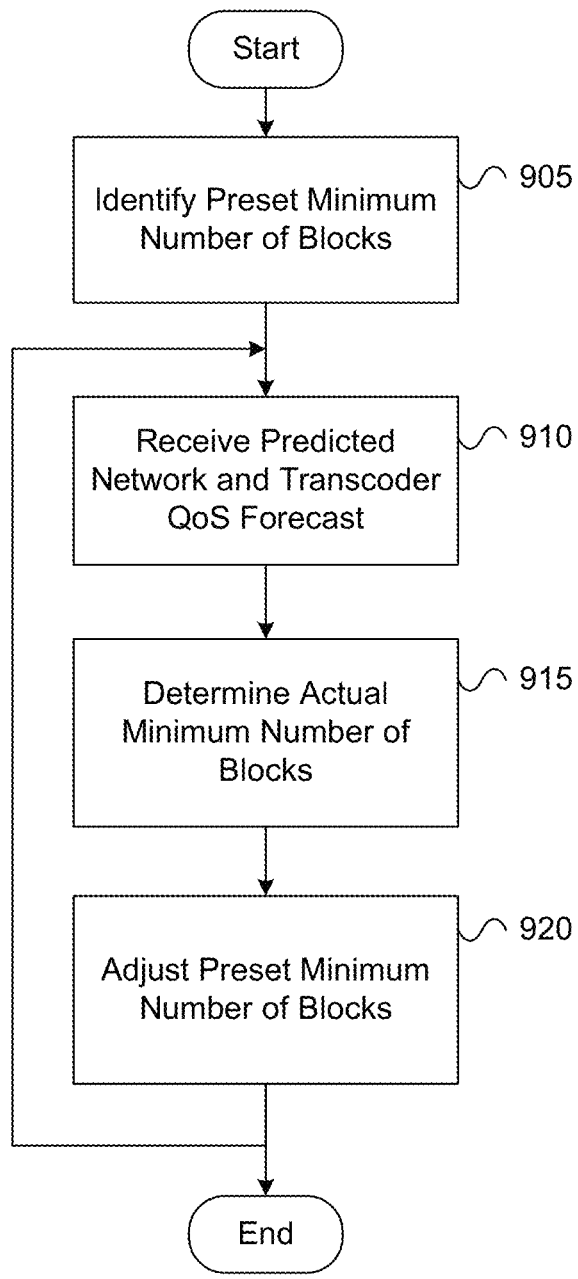
FIG. 9 illustrates a flowchart of an example of a method of reducing a latency time for initiating initial playback of content by a client device in accordance with one or more illustrative aspects discussed herein.

FIG. 9 depicts a flowchart of an illustrative method of reducing a latency time for initiating initial playback of content by a client device in accordance with one or more illustrative aspects discussed herein. In one or more embodiments, the method of FIG. 9 and/or one or more steps thereof may be performed by a computing device (e.g., computing device 200). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 905 in which a client device may identify and/or otherwise determine its preset minimum number of blocks. For example, in step 905, a client device (e.g., client device 408, 518, 618) may, using its decoder, identify and/or otherwise determine its preset minimum number of blocks of content data that the client device is preset to buffer prior to initiating playback of the content data at the client device.

In step 910, the client device may receive a predicted network and transcoder QoS forecast. For example, in step 910, the client device may receive a predicted network and transcoder QoS forecast and/or any quality of service metric from e.g., the dynamic block controller 122 and/or any device discussed herein.

Additionally or alternatively, in some embodiments, the client device might not receive the predicted network and transcoder QoS forecast. In such embodiments, the client device may determine the predicted network and transcoder QoS forecast by, for example, sending requests for quality of service metrics (e.g., bandwidth availability, downstream speed, upstream speed, transcoder conditions, etc.) to any of the devices discussed herein (e.g., any of the devices in network 400) and, in response, may receive from responding devices their respective quality of service metrics. Using the received quality of service metrics, the client device may determine the predicted network and transcoder QoS forecast.

In step 915, the client device may determine an actual minimum number of blocks and/or an actual minimum amount of content data to buffer prior to initiating playback of the content data. For example, in step 915, the client device may, using the predicted network and transcoder QoS forecast, determine the actual minimum number of blocks of a predetermined block size to buffer so as to enable the client device to begin uninterrupted playback of the content for a predetermined time period. In some embodiments, the predetermined block size may be, for example, a preset block size corresponding to a block size of the blocks used in identifying the preset minimum number of blocks.

In step 920, the client device may adjust its preset minimum number of blocks. For example, in step 920, the client device may adjust (e.g., increase or decrease) its preset minimum number of blocks to be equivalent to the actual minimum number of blocks. In some embodiments, the client device may update and/or readjust the preset minimum number of blocks by, for example, repeating steps 910-920.

For example, in step 905, the client device may identify its preset minimum number of blocks as being 10 blocks. In steps 910 and 915, the client device may receive a predicted network and transcoder QoS forecast and may, based on this information, determine that the actual minimum number of blocks to begin uninterrupted playback of the content for a predetermined time period may be 5 blocks. In step 920, the client device, via its decoder, may adjust its preset minimum number of blocks to begin playback of the content from 10 blocks to 5 blocks.

In some embodiments, the client device might not receive the predicted network and transcoder QoS forecast. In some embodiments, the client device may receive from a dynamic block controller 122 an instruction or command to adjust the preset minimum number of blocks of the client device to an actual minimum number of blocks determined by the dynamic block controller 122. In response to receiving the instruction, the client device may adjust its preset minimum number of blocks to be equivalent to the instructed actual minimum number of blocks.

In some embodiments, each client may have its own transcoder and packager. In some embodiments, a group of client devices may be associated with a transcoder and packager. As a result, the dynamic block controller 122 may dynamically adjust the block size on a per client device or a per group of client device basis. In some embodiments, the dynamic block controller 122 may determine the optimum block size (or I-frame interval) for each client device of a group and may adjust the block size to the average of the optimum block sizes.

As illustrated above, various aspects of the disclosure relate to providing dynamic blocks in multi-bitrate video. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
    receiving, by a computing device and from a client device, a request for a content item associated with a first data stream;
    determining, by the computing device, a minimum quantity of blocks for initial playback of the content item via the client device;
    generating, based on the minimum quantity of blocks for initial playback of the content item, a second data stream different from the first data stream, wherein the second data stream comprises a plurality of first blocks having a non-zero payload size and one or more second blocks having a payload size of zero, wherein each second block of the one or more second blocks is interleaved with one or more first blocks of the plurality of first blocks, and wherein the second data stream comprises identification information indicating the second data stream as the first data stream;
    sending, by the computing device and to the client device, a first portion of the second data stream; and
    decreasing a ratio of the one or more second blocks to the plurality of first blocks in the second data stream.

2. The method of claim 1, further comprising:
    adjusting an I-frame interval of at least one first block of the plurality of first blocks.

3. The method of claim 1, further comprising:
    adjusting a size of a group of pictures in at least one first block of the plurality of first blocks.

4. The method of claim 1, further comprising:
    adjusting a quantity of groups of pictures in at least one first block of the plurality of first blocks.

5. The method of claim 1, further comprising:
    determining network conditions of a network comprising a cable modem termination system; and
    adjusting, based on the network conditions, a quantity of groups of pictures in at least one first block of the plurality of first blocks.

6. The method of claim 1, further comprising:
    adjusting, on a per-client-device basis or a per-group-of-client-devices basis, a quantity of groups of pictures in at least one first block of the plurality of first blocks.

7. The method of claim 1, wherein each second block of the one or more second blocks comprises a header.

8. The method of claim 1, wherein a decoder of the client device has a policy to buffer a second minimum quantity of blocks of the content item prior to initiating output of the content item.

9. The method of claim 1, further comprising adjusting a block size of at least one first block of the plurality of first blocks to align transmission of the at least one first block of the plurality of first blocks with transmission of a corresponding block of another data stream.

10. The method of claim 1, wherein each second block of the one or more second blocks is interleaved with one or more first blocks of the plurality of first blocks by adding, in the second data stream, one of the one or more second blocks for every three blocks of the plurality of first blocks.

11. The method of claim 1, wherein each second block of the one or more second blocks is interleaved with one or more first blocks of the plurality of first blocks based on a pattern.

12. An apparatus comprising:
    one or more processors; and
    memory storing instructions that, when executed by the one or more processors, cause the apparatus to:
        receive, from a client device, a request for a content item associated with a first data stream;
        determine a minimum quantity of blocks for initial playback of the content item via the client device;
        generate, based on the minimum quantity of blocks for initial playback of the content item, a second data stream different from the first data stream, wherein the second data stream comprises a plurality of first blocks having a non-zero payload size and one or more second blocks having a payload size of zero, wherein each second block of the one or more second blocks is interleaved with one or more first blocks of the plurality of first blocks, and wherein the second data stream comprises identification information indicating the second data stream as the first data stream;
        send, to the client device, a first portion of the second data stream; and
        decrease a ratio of the one or more second blocks to the plurality of first blocks in the second data stream.

13. The apparatus of claim 12, wherein the instructions, when executed by the one or more processors, further cause the apparatus to:
    adjust an I-frame interval of at least one first block of the plurality of first blocks.

14. The apparatus of claim 12, wherein the instructions, when executed by the one or more processors, further cause the apparatus to:
    adjust a size of a group of pictures in at least one first block of the plurality of first blocks.

15. The apparatus of claim 12, wherein the instructions, when executed by the one or more processors, further cause the apparatus to:
    adjust a quantity of groups of pictures in at least one first block of the plurality of first blocks.

16. The apparatus of claim 12, wherein the instructions, when executed by the one or more processors, further cause the apparatus to:
    determine network conditions of a network comprising a cable modem termination system; and
    adjust, based on the network conditions, a quantity of groups of pictures in at least one first block of the plurality of first blocks.

17. The apparatus of claim 12, wherein the instructions, when executed by the one or more processors, further cause the apparatus to:
adjust, on a per-client-device basis or a per-group-of-client-devices basis, a quantity of groups of pictures in at least one first block of the plurality of first blocks.

18. The apparatus of claim 12, wherein each second block of the one or more second blocks comprises a header.

19. The apparatus of claim 12, wherein the instructions, when executed by the one or more processors, further cause the apparatus to:
determine a second minimum quantity of blocks prior to initiating output of the content item based on a policy associated with a decoder of the client device.

20. The apparatus of claim 12, wherein the instructions, when executed by the one or more processors, further cause the apparatus to:
adjust a block size of at least one first block of the plurality of first blocks to align transmission of the at least one first block of the plurality of first blocks with transmission of a corresponding block of another data stream.

21. The apparatus of claim 12, wherein each second block of the one or more second blocks is interleaved with one or more first blocks of the plurality of first blocks by adding, in the second data stream, one of the one or more second blocks for every three blocks of the plurality of first blocks.

22. The apparatus of claim 12, wherein each second block of the one or more second blocks is interleaved with one or more first blocks of the plurality of first blocks based on a pattern.

23. A system comprising:
a client device and a computing device,
wherein the client device comprises:
one or more first processors; and
first memory storing first instructions that, when executed by the one or more first processors, cause the client device to:
send a request for a content item associated with a first data stream; and
wherein the computing device comprises:
one or more second processors; and
second memory storing second instructions that, when executed by the one or more second processors, cause the computing device to:
receive, from the client device, the request for the content item associated with the first data stream;
determine a minimum quantity of blocks for initial playback of the content item via the client device;
generate, based on the minimum quantity of blocks for initial playback of the content item, a second data stream different from the first data stream, wherein the second data stream comprises a plurality of first blocks having a non-zero payload size and one or more second blocks having a payload size of zero, wherein each second block of the one or more second blocks is interleaved with one or more first blocks of the plurality of first blocks, and wherein the second data stream comprises identification information indicating the second data stream as the first data stream;
send, to the client device, a first portion of the second data stream; and
decrease a ratio of the one or more second blocks to the plurality of first blocks in the second data stream.

24. The system of claim 23, wherein the second instructions, when executed by the one or more second processors, further cause the computing device to:
adjust an I-frame interval of at least one first block of the plurality of first blocks.

25. The system of claim 23, wherein the second instructions, when executed by the one or more second processors, further cause the computing device to:
adjust a size of a group of pictures in at least one first block of the plurality of first blocks.

26. The system of claim 23, wherein the second instructions, when executed by the one or more second processors, further cause the computing device to:
adjust a quantity of groups of pictures in at least one first block of the plurality of first blocks.

27. The system of claim 23, wherein the second instructions, when executed by the one or more second processors, further cause the computing device to:
determine network conditions of a network comprising a cable modem termination system; and
adjust, based on the network conditions, a quantity of groups of pictures in at least one first block of the plurality of first blocks.

28. The system of claim 23, wherein the second instructions, when executed by the one or more second processors, further cause the computing device to:
adjust, on a per-client-device basis or a per-group-of-client-devices basis, a quantity of groups of pictures in at least one first block of the plurality of first blocks.

29. The system of claim 23, wherein each second block of the one or more second blocks comprises a header.

30. The system of claim 23, wherein a decoder of the client device has a policy to buffer a second minimum quantity of blocks of the content item prior to initiating output of the content item.

31. The system of claim 23, wherein the second instructions, when executed by the one or more second processors, further cause the computing device to:
adjust a block size of at least one first block of the plurality of first blocks to align transmission of the at least one first block of the plurality of first blocks with transmission of a corresponding block of another data stream.

32. The system of claim 23, wherein each second block of the one or more second blocks is interleaved with one or more first blocks of the plurality of first blocks by adding, in the second data stream, one of the one or more second blocks for every three blocks of the plurality of first blocks.

33. The system of claim 23, wherein each second block of the one or more second blocks is interleaved with one or more first blocks of the plurality of first blocks based on a pattern.

* * * * *

UNITED STATES PATENT AND TRADEMARK OFFICE
CERTIFICATE OF CORRECTION

PATENT NO. : 10,804,958 B2
APPLICATION NO. : 14/630107
DATED : October 13, 2020
INVENTOR(S) : Gilson It is certified that error appears in the above-identified patent and that said Letters Patent is hereby corrected as shown below:

In the Specification

Column 15, Detailed Description, Line 45:
Delete "610$f$" and insert --618$f$-- therefor Column 16, Detailed Description, Line 3:
Delete "512$a$" and insert --514$a$-- therefor Column 16, Detailed Description, Line 4:
Delete "514$a$." and insert --512$a$.-- therefor Column 16, Detailed Description, Line 6:
Delete "512$d$" and insert --514$d$-- therefor Column 16, Detailed Description, Line 7:
Delete "514$d$." and insert --512$d$.-- therefor Signed and Sealed this
Seventeenth Day of January, 2023

Katherine Kelly Vidal
*Director of the United States Patent and Trademark Office*